United States Patent

Fickelscher

[11] 4,041,808
[45] Aug. 16, 1977

[54] PLANETARY GEARING

[75] Inventor: Kurt Gerhard Fickelscher, Frankenthal, Pfalz, Germany

[73] Assignee: Balke-Durr AG, Ratingen, Germany

[21] Appl. No.: 676,702

[22] Filed: Apr. 14, 1976

[30] Foreign Application Priority Data

Apr. 15, 1975 Germany .............................. 2516474
Nov. 24, 1975 Germany .............................. 2552588

[51] Int. Cl.² ........................................... F16H 1/28
[52] U.S. Cl. .............................................. 74/800
[58] Field of Search ...................... 74/800; 64/9 R, 21

[56] References Cited

U.S. PATENT DOCUMENTS 3,353,426 11/1967 Wiser et al. ............................. 74/800
3,385,135 5/1968 Strandberg ............................ 74/800
3,540,307 11/1970 Schell .................................... 74/800

*Primary Examiner*—Samuel Feinberg
*Attorney, Agent, or Firm*—Herbert L. Lerner

[57] ABSTRACT

Planetary gearing includes a rotatable swash plate, at least another toothed plate engaged by the swash plate, the plates being disposed in respective intersecting radial planes having an angle $\beta$ included therebetween, the plates having on respective faces thereof different numbers of substantially triangular or trapezoidal teeth formed on respective conical surfaces, the teeth of the other toothed plate having flanks, extension lines from all of the flanks intersecting in points located on an imaginary circle having an axis coincident with the axis of the other toothed plate, the teeth of the toothed swash plate having flanks, extension lines from all of the flanks of the swash plate teeth intersecting in a common point, the common point during rotation of the swash plate, defining the imaginary circle as the base of an imaginary cone, an angle $\gamma = 2\beta/\pi$ being included between projected radial planes of the respective rows of the teeth of the swash plate and the other plate and being defined in the following equation:

$$\gamma = \text{arc sin} \left[ \frac{\cos\alpha}{Z1/Z2} \cdot (\pm \sqrt{\sin^2\alpha + (\frac{Z1}{Z2})^2 - 1} - \sin\alpha) \right]$$

where
$Z1$ = the number of teeth of the other plate,
$Z2$ = the number of teeth of the swash plate, and
$2\alpha$ = the angle formed between the flanks of a tooth.

33 Claims, 33 Drawing Figures

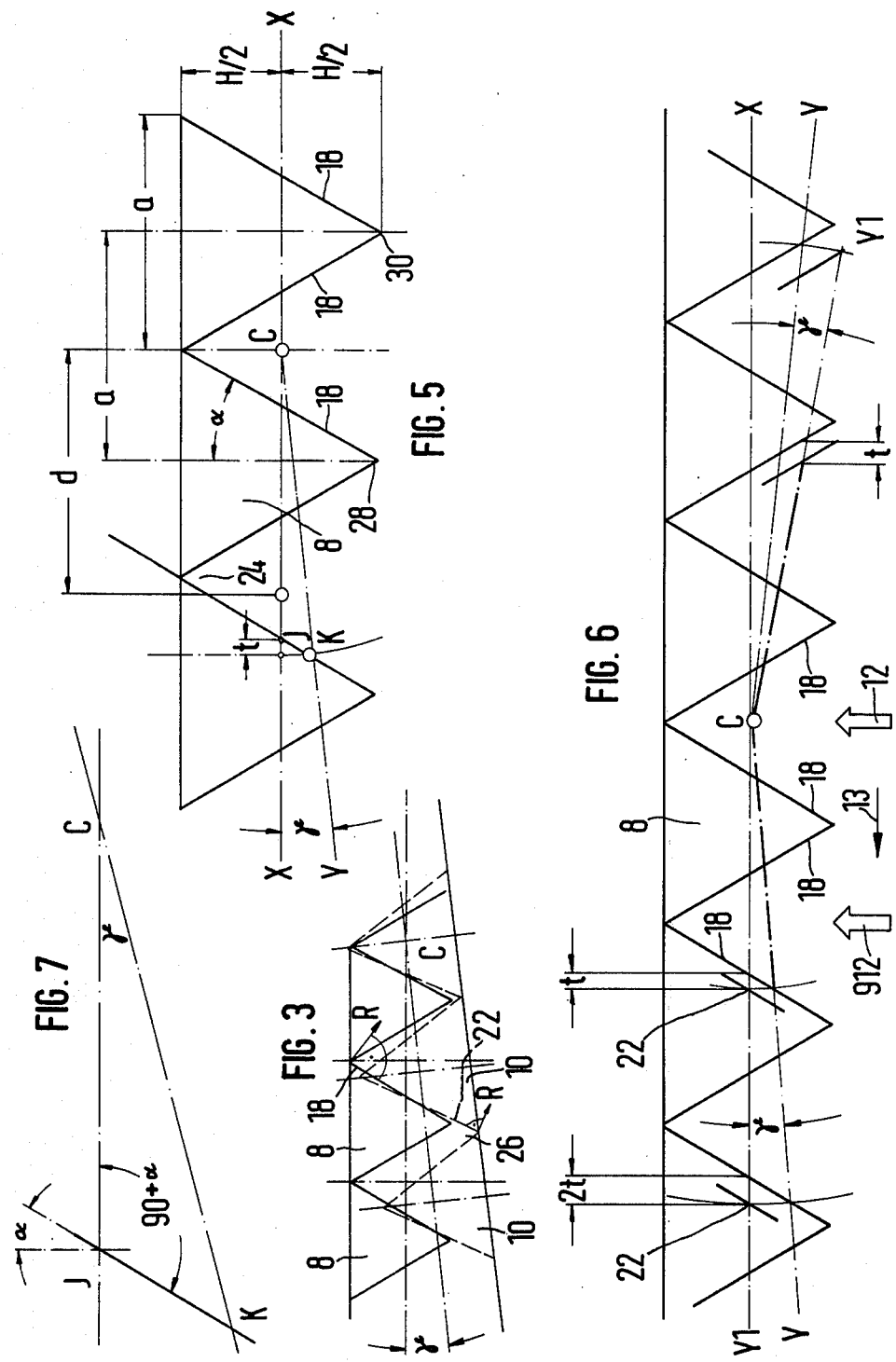

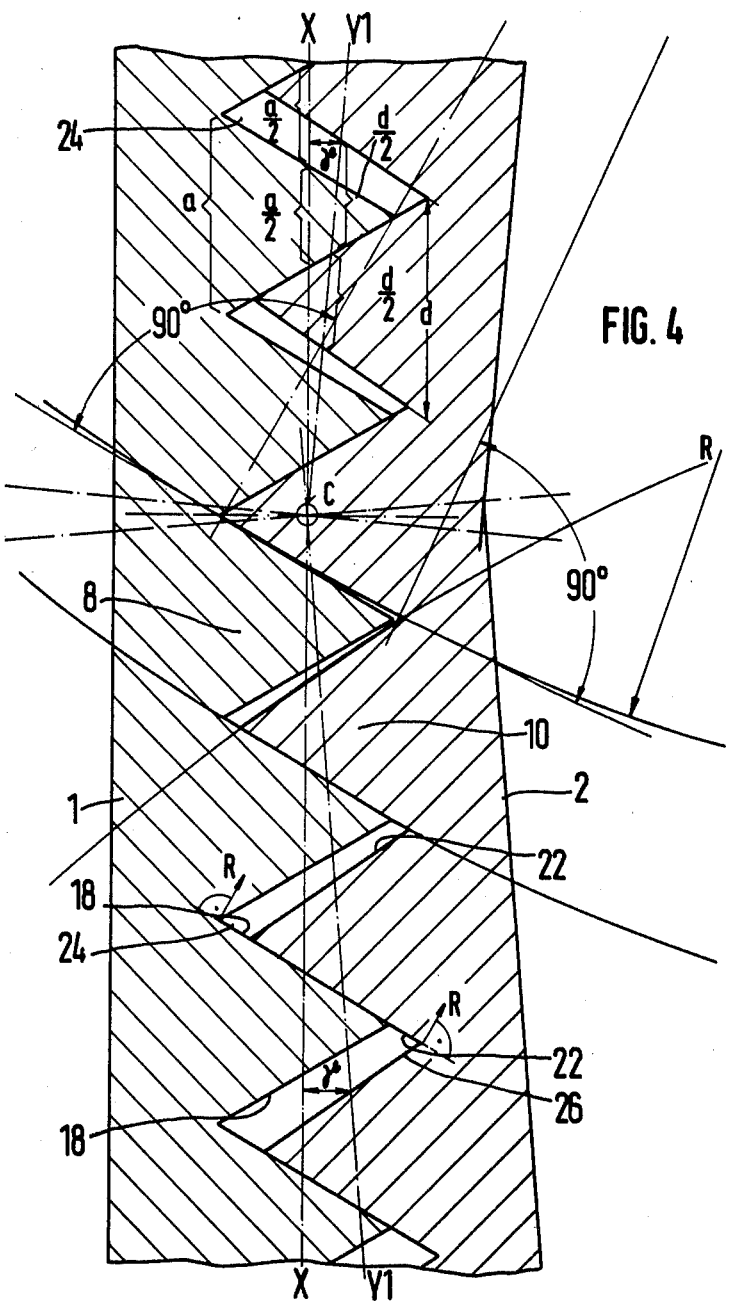

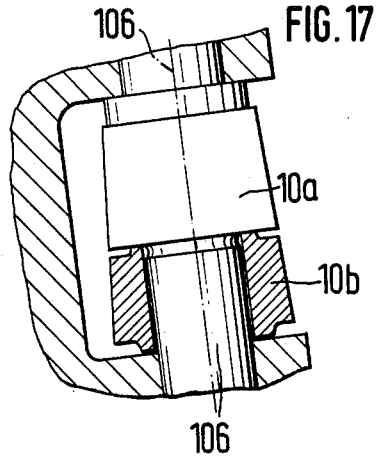
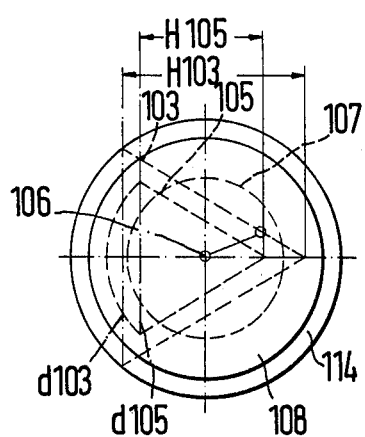
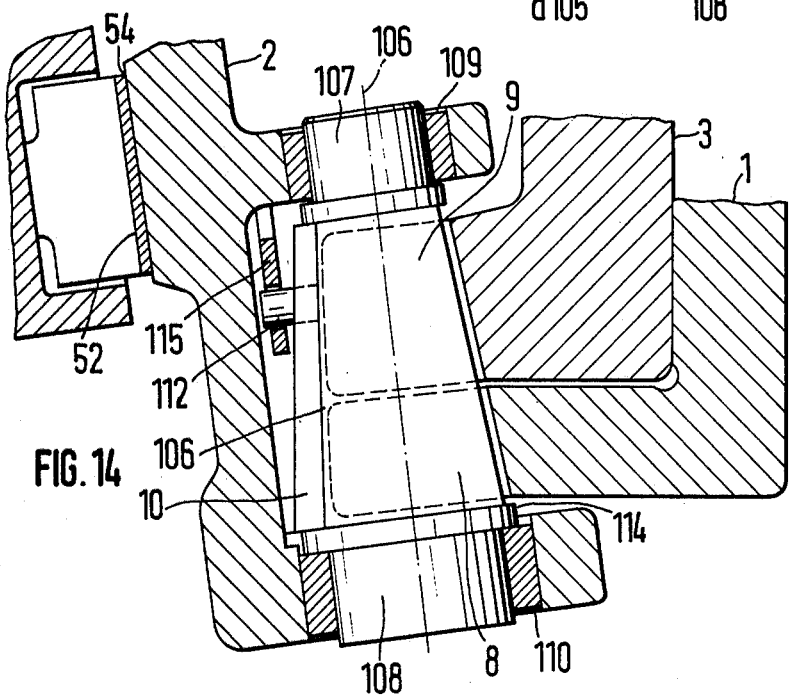

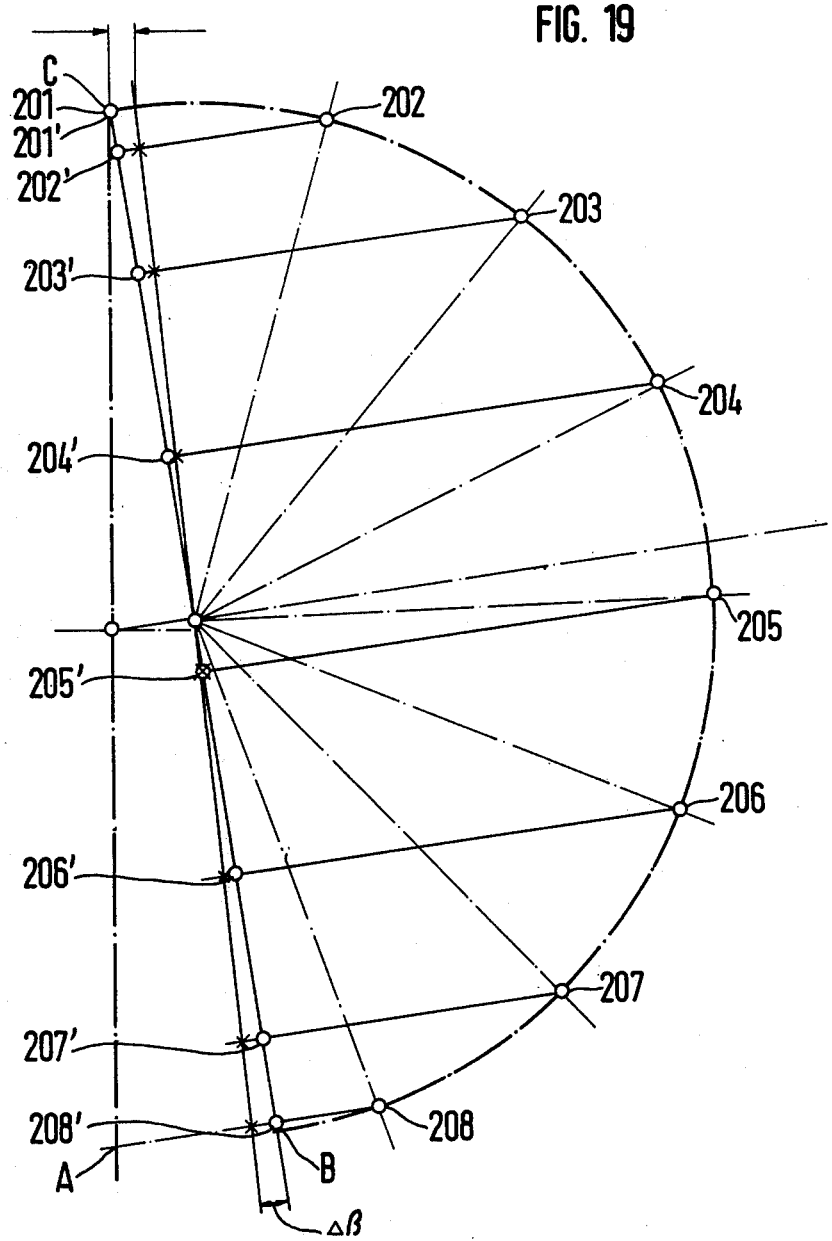

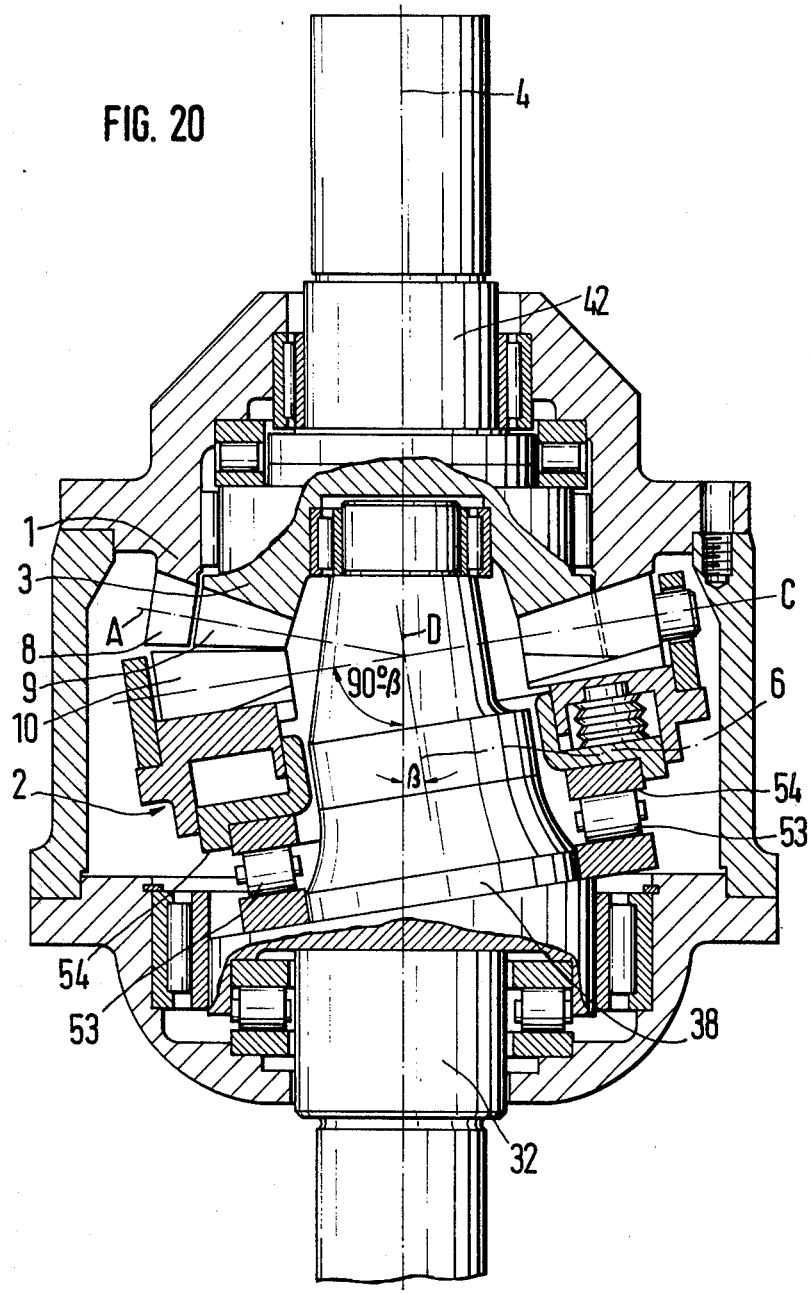

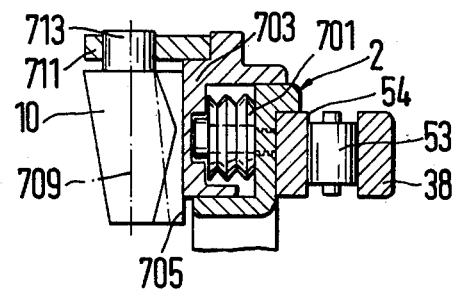
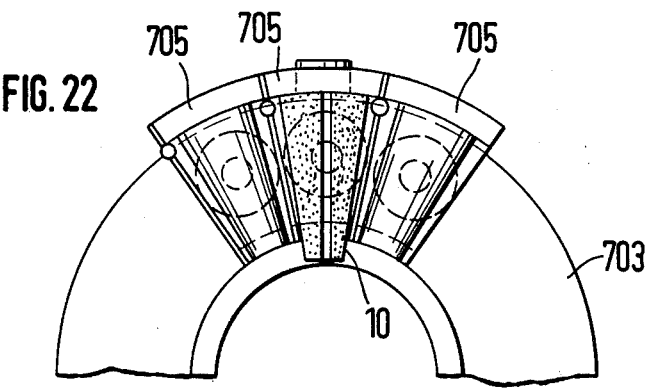
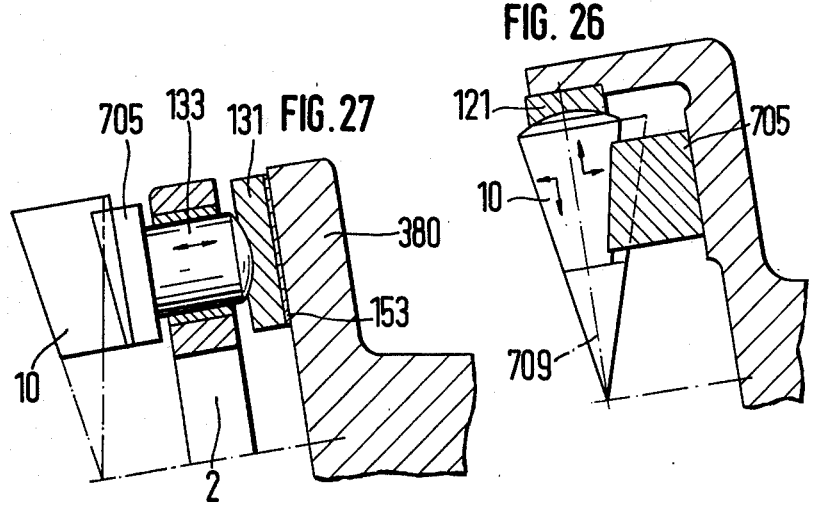

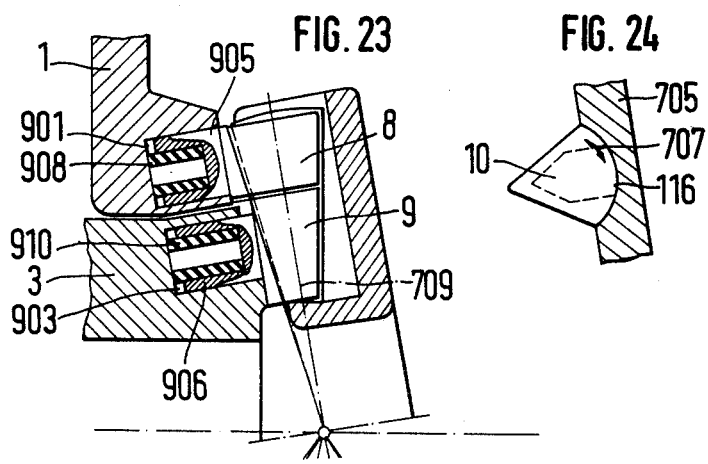
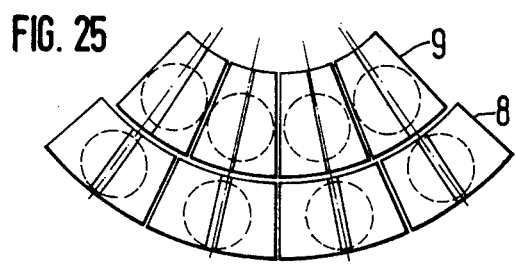
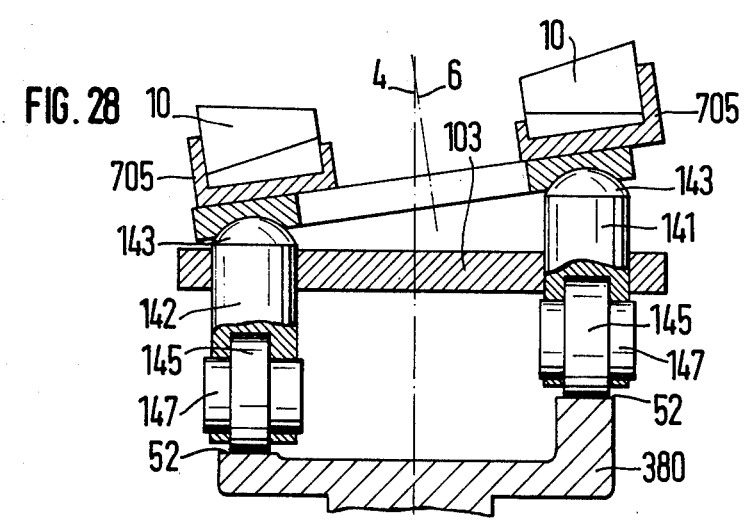

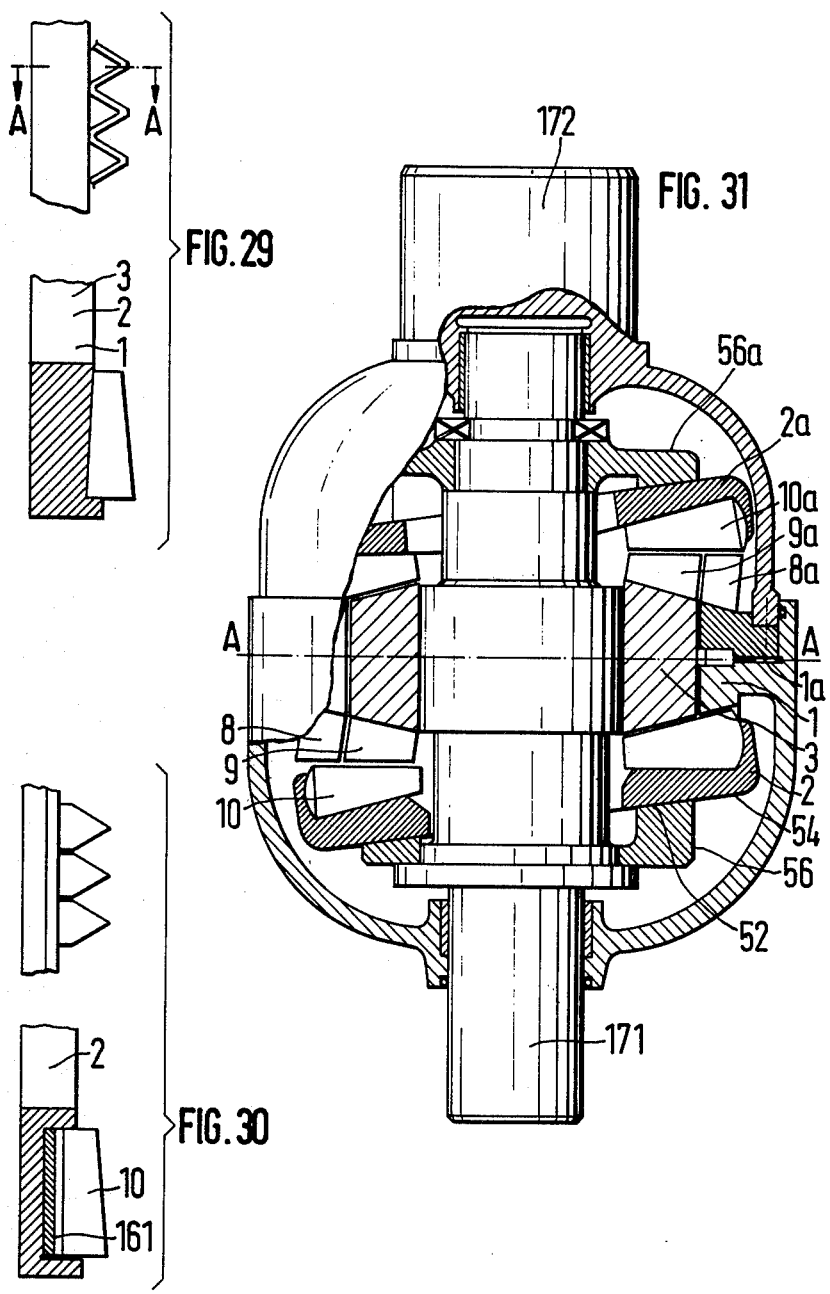

PLANETARY GEARING

The invention relates to planetary gearing and, more particularly, to such planetary gearing having a rotating toothed swash-plate engaging or braced on at least one other toothed plate, the radial planes of the plates including an angle $\beta$, unequal numbers of substantially triangular or trapezoidal teeth being provided on conical surfaces on the outer end faces of the plates. In the case of these heretofore known gears only two teeth of two combining plates are in meshing engagement at any one time. They engage linearly with nonharmonic or irregular course of movement, so that the gears lose their unevenness only after running-in. The transmissible torque is thereby limited or restricted. In the transmission of greater torques, the diameter of conventional gearing must be increased accordingly.

Efforts have been made to increase the number of meshing teeth. German Patent DT-PS No. 1,135,259 shows such a gearing in which up to 27.5% of the teeth are in meshing engagement. The transmissible torque, however, being limited due to the use of a thin elastic hollow gear.

It is accordingly an object of the invention to provide planetary gearing which is improved over the heretofore known planetary gearing to the effect that the swash plate, with almost all of the teeth thereof as possible flatly engaging, meshes with the teeth of the other toothed plate, in order either to be able to transmit higher torque or, for equal torque, to be able to reduce the dimensions and the weight of the gearing.

With the foregoing and other objects in view, there is provided in accordance with the invention, planetary gearing comprising a rotatable swash plate, at least another toothed plate engaged by the swash plate, the plates being disposed in respective intersecting radial planes having an angle $\beta$ included therebetween, the plates having on respective faces thereof different numbers of substantially triangular or trapezoidal teeth formed on respective conical surfaces, the teeth of the other toothed plate having flanks, extension lines from all of the flanks intersecting in points located on an imaginary circle having an axis coincident with the axis of the other toothed plate, the teeth of the toothed swash plate having flanks, extension lines from all of the flanks of the swash plate teeth intersecting in a common point, the common point, during rotation of the swash plate, defining the imaginary circle as the base of an imaginary cone, an angle $\gamma = 2\beta/\pi$ being included between projected radial planes of the respective rows of the teeth of the swash plate and the other plate and being defined in the following equation:

$$\gamma = \arcsin\left[\frac{\cos\alpha}{Z1/Z2} \cdot (\pm\sqrt{\sin^2\alpha + (\frac{Z1}{Z2})^2 - 1} - \sin\alpha)\right]$$

where
Z1 = the number of teeth of the other plate,
Z2 = the number of the swash plate, and
2$\alpha$ = the angle formed between the flanks of a tooth.

Due to the association, according to the invention, of the flank lines of the plates as well as the angles in accordance with the given mathematical relationship, the greatest possible number of teeth of the swash plate comb or mesh with a respective tooth of the other toothed plate. In this regard, the relationship $L \cdot \tan\beta \geq H$ is formed between the diameter $L$ of the plates and the height $H$ of the teeth, whereby the plates are able to move toward one another. In the ideal case, $L \cdot \tan\beta = H$; then, all the teeth of the swash plate comb or mesh with teeth of the other toothed plate up to the difference in the numbers of the teeth between the two plates.

In the gearing according to the invention, the surfaces of the teeth slide on one another whereas, in the heretofore known gearings of this general type, rolling on one another occurs with linear contact at all times.

In accordance with another feature of the invention the gearing includes an additional toothed plate coaxial with the other plate, the teeth of the other and the additional plates jointly forming a virtual row of teeth mutually having substantially constant spacing therebetween, the coaxial toothed plates having respective numbers of teeth differing i.e. greater or smaller, by a whole number from the number of teeth of the swash plate.

To insure that the specific surface pressure in uniform on all the flanks of the teeth of the coaxial plates and of the swash plate, in accordance with a further feature of the invention, the ratio of the areas of the flanks of the teeth of the coaxial plates to one another is a reciprocal of the ratio of the respective radii of the coaxial plates to one another.

In accordance with an additional feature of the invention, the gearing includes a drive shaft connected to the swash plate and a driven shaft connected to the other toothed plate, and further includes two additional toothed plates, the additional toothed plates and the other toothed plate being coaxial to the driven shaft, the teeth of the other and the two additional toothed plates having respective numbers of teeth differing i.e. larger or smaller by a whole number from the number of teeth of the swash plate.

In the foregoing embodiments of the invention having two or three coaxial toothed plates, the angle 2$\alpha$ between the flanks of the teeth of the coaxial plates, respectively, differs and is determinable in accordance with the aforementioned equation:

$$\gamma = \arcsin\left[\frac{\cos\alpha}{Z1/Z2} \cdot (\pm\sqrt{\sin^2\alpha + (\frac{Z1}{Z2})^2 - 1} - \sin\alpha)\right].$$

If the number of teeth in a pair of combing or meshing rows of teeth i.e. in the case of a swash plate and only one other plate, is relatively small, the exactly triangular shape of the teeth may somewhat disturb the smooth running or course of movement thereof.

In accordance, therefore, with an added feature of the invention, the flanks of the teeth of one of the toothed plates have a convex shape and form part of the surface of an imaginary cylinder, the cylinder having an axis parallel to the radial plane of a tooth of one of the plates and disposed in the intersection of two planes which extend through a flank of the respective tooth within the internal angle between adjacent teeth of one of the plates.

When two or three coaxial toothed plates are provided together with the swash plate, then this convex shaping of the flanks of the teeth applies only to the teeth of the swash plate, in accordance with the invention.

Instead of having this convex construction, the teeth of the swash plate may have flat or planar flanks if the teeth are pivotable. Thus, in accordance with another feature of the invention, the gearing includes an additional toothed plate coaxial with the other plate, and the teeth of the swash plate are pivotable about respective pivot axes extending radially to the axis of the swash plate.

In accordance with yet a further feature of the invention, the pivot axis of each of the pivotable teeth of the swash plate is disposed at a level that is half the height of the respective flanks of the pivotable teeth. In regard thereto, the flanks of nearly all the pivotable teeth are in contact at all times with the flanks of opposite teeth so that the angular position thereof is exactly defined. Several of the teeth, however, are not in contact with the flanks of any other teeth so that they are able to swing about the respective pivot axes thereof in an undesired manner. This can cause disturbances in the operation of the gearing. To avoid this disadvantage, in accordance with another feature of the invention, each of the pivotable teeth of the swash plate carries a respective pin outside the flanks of the respective teeth, the pins being disposed eccentrically to the pivot axes of the respective teeth, and the guide ring is floatingly disposed coaxially to the swash plate and formed with respective bores in which the pins are loosely received. The correct angular position also of those teeth which are not in meshing engagement is thereby assured.

The teeth of the coaxial plates form a virtual row of teeth mutually having substantially constant or uniform spacing therebetween. Here and hereinafter, reference is made to the fact that both rows of teeth of both coaxial plates form $a$ virtual row of teeth. In this connection, it is noted that, as explained hereinafter with respect to the figures of the drawings, a second virtual row of teeth is formed by the overlapping of the rows of teeth of both plates. In principle, it is immaterial as to which of the two virtual rows of teeth, that are formed, the teeth of the freely movable plate are to comb or mesh with; depending upon which of the two virtual rows of teeth is actually used, the rotary direction or sense will vary for the same plate that is held fast or locked. When the virtual third row of teeth is referred to hereinafter, there is meant that one of the two virtual rows of teeth that are formed that is actually used. The choice is purely optional.

From the foregoing large equation for the angle $\gamma$, it is readily determinable that the angle $\beta$ increases with decreasing transmission ratio. A result thereof is that the circle EF becomes larger, which means that the eccentric mass of the swash plate increases. This can cause an imbalance especially at relatively high rotary speeds and can impair the smooth running of the transmission system. It is therefore an objective of the invention to provide gearing that will have an improved smoothness or quietness of operation over corresponding prior-art gearing without requiring more precise construction of the components of the gearing.

If the numbers of teeth of the swash plate and the coaxial plates are relatively small, difficulties will arise due to the fact that the teeth of the swash plate will only incompletely mesh in the spaces between the teeth of the virtual rows of teeth. The complete engagement of all of the flanks of the teeth is thereby placed in doubt and, especially, the torque transmission is impaired. Also, this problem, which is discussed in greater detail hereinafter with respect to the drawings, is solved by means of the construction according to the invention.

In accordance with another feature of the invention, therefore, the teeth of the coaxial additional and other toothed plates jointly form a virtual row of teeth mutually having substantially constant spacing therebetween, the radial plane of the swash plate being pivoted about the point of intersection of the axis of the swash plate with the radial plane of the swash plate so that the angle $\beta$ is decreased by a correction factor $\Delta\beta$ determinable by the equation:

$$\sin\Delta\beta = (2\pi/\eta) \cdot \sin \gamma,$$

where $\eta$ = the number of teeth in the virtual row of teeth i.e. the number of teeth of the swash plate if the latter has all the teeth.

In accordance with an added feature of the invention, the teeth of the coaxial toothed plates are pivotable about an axis extending substantially perpendicularly to respective planes bisecting the teeth of the coaxial toothed plates in the height thereof, and, are shiftable in direction of the last-mentioned axis. Through this pivotable and axially shiftable disposition of the teeth of the coaxial plates, it is possible to change the circle at will, whereby the incident defects or faults are corrected automatically due to the shiftability and pivotability of the teeth.

It is especially possible to reduce the diameter of the circle EF and, in fact, to let this circle shrink or contract to a point. The eccentricity of the movement of the swash plate is thus reduced and the smoothness or quietness of running of the gearing at relatively high rotary speeds is considerably improved. When the numbers of teeth of the various plates are small, those faults or defects which would otherwise result in incomplete meshing of the teeth of the swash plate with the virtual row of teeth are balanced or equalized by the shiftability of the teeth of the coaxial plates; the teeth of the coaxial plates are shifted (by a spring) so far in direction toward the teeth of the swash plate that the virtual row of teeth is automatically adjusted to or matched with the row of teeth of the swash plate, and optimal meshing of the row of teeth of the swash plate with the virtual row of teeth is achieved.

The pivotable and shiftable construction of the teeth of the coaxial plates, in accordance with the invention thus solves the many-faceted problems which arise with high rotary speeds, low transmission ratios (below about 15) and small numbers of teeth. Through the constructions according to the invention of the instant application, it is furthermore possible to manufacture the teeth of the coaxial plates by low-cost mass-production techniques from especially highly resistant material, whereas the remainder of the plates can be formed of cheaper material. This reduction in the cost of manufacture is not of any lesser importance from the economic standpoint than the functional advantages that may be observed especially for high rotary speeds, low transmission ratios and low numbers of teeth. Because of this reduction in manufacturing costs, the construction of the gearing with shiftable individual teeth for the coaxial plates is preferable also for optional rotary speeds, transmission ratios and numbers of teeth.

In accordance with a further feature of the invention, therefore, the gearing includes guide means extending perpendicularly to a plane bisecting the teeth of the swash plate in the height thereof, the teeth of the swash plate being shiftable along the guide means. Whereas, in the earlier construction, the teeth of the coaxial plates are shifted and an adjustment or accommodation of the virtual row of teeth to the row of teeth of the swash plate is effected, in the last-mentioned construction, the teeth of the swash plate are shifted and are adjusted or accommodated to the non-variable or possibly variable virtual row of teeth. Although this last-mentioned construction is somewhat less costly than the aforementioned earlier construction, it is, however, less suited for high rotary speeds, low transmission ratios and low numbers of teeth.

In accordance with additional features of the invention, biasing means, such as a spring or an hydraulic device, are provided for pressing each of the teeth of the swash plate into the virtual row of teeth.

In accordance with an added feature of the invention, the gearing includes a bearing for each of the pivots of the teeth of the swash plate, a guide plate disposed parallel to the axis of the coaxial plates, a pin carrying the bearing and being guidable in the guide plate so as to be shiftable parallel to the axis of the coaxial plates, and drive gear means for imparting a reciprocating movement to the pin.

In accordance with other features of the invention, each of the pins is spring-biased towards the virtual row of teeth, and the drive gear means comprises a cam plate having an annular surface for sliding the teeth of the swash plate into the virtual row of teeth so deeply that they fully mesh within the spaces between the teeth of the virtual row of teeth.

In accordance with another feature of the invention, the cam plate is so constructed that a plurality of groups of the teeth of the swash plate are each meshable thereby with a respective virtual row of teeth.

In accordance with a further feature of the invention, the teeth of the swash plate are shiftable freely about the periphery of the swash plate.

In accordance with an added feature of the invention, the gearing includes pivotal bearing bed means, the teeth of the swash plate being mounted in the pivotal bearing bed means and being radially displaceable therein.

When many of the following features of the invention are combined with the construction wherein the radial plane of the swash plate is pivoted about the point of intersection of the axis of the swash plate with the radial plane of the swash plate so that the angle $\beta$ is decreased by a correction factor $\Delta\beta$ determinable by the equation:

$$\sin \Delta\beta = (2\pi/\eta) \cdot \sin \gamma,$$

where $\eta$ = the number of teeth in the virtual row of teeth jointly formed by two coaxial toothed plates, special advantages are attainable, such as, for example, shorter spring travel or excursions.

The features of the invention which are of special value when combined with the last-mentioned structural features thereof are, for example, that the teeth of the coaxial plates are pivotable about an axis extending substantially perpendicularly to respective planes bisecting the teeth of the coaxial plates in the height thereof, and are shiftable in direction of the last-mentioned axis; that guide means extend perpendicularly to a plane bisecting the teeth of the swash plate in the height thereof, the teeth of the swash plate being shiftable along the guide means; that a bearing is provided for each of the pivots of the teeth of the swash plate, as well as a guide plate disposed parallel to the axis of the coaxial plates, a pin carrying the bearing and being guidable in the guide plate so as to be shiftable parallel to the axis of the coaxial plates, and drive gear means for imparting a reciprocating movement to the pin; that the teeth of the swash plate are shiftable freely about the periphery of the swash plate; that pivotal bearing bed means are provided, and the teeth of the swash plate are mounted in the pivotal bearing means and are radially displaceable therein.

The foregoing combination of features which are of special value as well as the hereinafter-mentioned additional features are especially suited for transmission higher than about 6.

The additional features just referred to are that the teeth are pressed inwardly by biasing means such as a spring or an hydraulic device; the inclusion of cam plate means pressing the teeth of the swash plate radially inwardly, the cam plate means determining the depth of penetration by the last-mentioned teeth into the virtual row of teeth; that the biasing means has a characteristic that equal pressure is exerted on all of the flanks of the teeth of the swash plate; that the biasing means comprises a flexible pad, a helical spring or a packet of plate springs or that the teeth of the swash plate are of themselves formed of resilient material; and that the teeth of resilient material are formed of zigzag or corrugated metal sheets.

For even lower transmissions than 6, the numbers of teeth become so small and the shape and the angle $\beta$ so large that the possibilities of correction effected by the foregoing combination of features having special value as well as by the last-mentioned additional features are no longer economical. For such extreme cases, namely for transmission ratios lower than about 6, gearing is provided in accordance with the invention including an additional toothed plate coaxial with the other toothed plate and disposed radially inwardly thereof, the radially inward additional toothed plate having a first row of teeth on one side of a reflection plane thereof and a second row of teeth on the other side of the reflection plane and being a mirror image of the first row of teeth, a radially outward further toothed plate being a mirror image of the radially outward other toothed plate, and further toothed plate having teeth which are a mirror image of the teeth of the other toothed plate, the teeth of the swash plate meshing with the first row of teeth of the additional toothed plate and the teeth of the other toothed plate, another swash plate meshing with the second row of teeth of the additional toothed plate and the teeth of the further toothed plate, and means for driving both of the swash plates, the numbers of teeth of the first-mentioned swash plate, the other toothed plate and the first row of teeth of the additional toothed plate being independent of the numbers of teeth of the other swash plate, the further toothed plate and the second row of teeth of the additional toothed plate, the total transmission $i_T$ of the gearing being determinable by the following equation:

$$\frac{1}{i_T} = \frac{1}{i_1} + \frac{i_1 - 1}{i_1 \cdot i_2}$$

wherein $$i_1 = \frac{Z9}{Z9 - Z8} \text{ and } i_2 = \frac{Z8a}{Z8a - Z9a}$$

and $Z8$ = the number of teeth of the other toothed plate
$Z9$ = the number of teeth of the first row of teeth of the additional toothed plate $Z8a$ = the number of teeth of the further toothed plate, and $Z9a$ = the number of teeth of the second row of teeth of the additional toothed plate.

The last-described construction can, of course, be advantageously combined with one or more of the preceding features, and affords the realization of any low transmission ratio desired as well as virtually unlimited high transmission ratios. Furthermore, with this gearing construction according to the invention, optimal balance or equalization of an imbalance is provided, so that very high rotary speeds may be employed.

In accordance with yet another feature of the invention, the gearing includes an additional toothed plate coaxial with the other plate, a drive shaft secured against relative rotation therewith to one of the coaxial plates, a driven shaft secured against relative rotation therewith to the other of the coaxial plates, a rotatably mounted bearing plate for the swash plate, and means for applying a control movement to the bearing plate whereby it serves as a reaction member. By braking the reaction member, the transmission ratio of the gearing is reducible continuously down to a ratio of 1 until it actually reaches 1 when the reaction member is at standstill; the gearing or transmission has then become a coupling. If the reaction member is accelerated, on the other hand, other transmission ratios may be realized which differ from the ratio 1 to a greater extent than if the reaction member had not been accelerated. Such a gearing or transmission is especially suited for continuously varying the transmission ratio. Ony minimal torques are necessary to brake or accelerate the reaction member because only friction has to be overcome.

Uniform and smooth running of the gearing according to the invention is not disturbed even if several teeth or groups of teeth are missing from a row of teeth of the swash plate. On the other hand, it is also possible to allow gearing construction in accordance with the invention to continue to run free of disturbance even if several teeth of swash plate are damaged or have been broken off.

In accordance with a concomitant feature of the invention, there is therefore provided gearing wherein the swash plate is formed with a limited number of individual teeth spaced at uniform intervals from one another.

Other features which are considered as characteristic for the invention are set forth in the appended claims.

Although the invention is illustrated and described herein as embodied in planetary gearing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 3 is a fragmentary diagrammatic projected view of the mutually meshing teeth of the embodiment of FIG. 1;

FIGS. 4 to 6 are enlarged views of FIG. 3 in different phases of the meshing plates;

FIG. 7 is an enlarged view of the triangle CKJ of FIG. 5;

FIG. 14 is an enlarged fragmentary view of FIG. 11 showing a modification of the detail XVI thereof, namely the provision therein of a tiltable tooth;

FIG. 15 is a diagrammatic bottom plan view of the tiltable tooth of FIG. 14;

FIG. 17 is a view similar to that of FIG. 14 of a two-piece tiltable tooth;

FIG. 19 is a schematic circular representation of the construction of FIG. 13;

FIG. 20 is a sectional view of yet another embodiment of the gearing of the invention;

FIG. 21 is a fragmentary view of FIG. 20 showing a holding device for one of the teeth;

FIG. 22 is a fragmentary plan view of the swash plate of FIG. 20 showing part of the row of teeth thereof;

FIG. 23 is an enlarged fragmentary view of FIG. 1 showing teeth of two coaxial plates in greater detail;

FIG. 24 is a fragmentary sectional view of the swash plate of FIG. 23 showing tiltable disposition of one of the teeth thereof;

FIG. 25 is a fragmentary plan view of FIG. 23 showing a section of the rows of teeth of the two coaxial plates;

FIGS. 26 and 27 are fragmentary sectional views of other embodiments of the swash plate showing the disposition of one of the teeth thereof;

FIG. 28 is a sectional view of yet another embodiment of the swash plate showing the disposition thereof;

FIGS. 29 and 30 are diagrammatic views of two alternative constructions of the teeth of the swash-plate;

FIG. 31 is a predominantly sectional view of a further embodiment of the gearing shown in FIG. 11.

Figure 1:
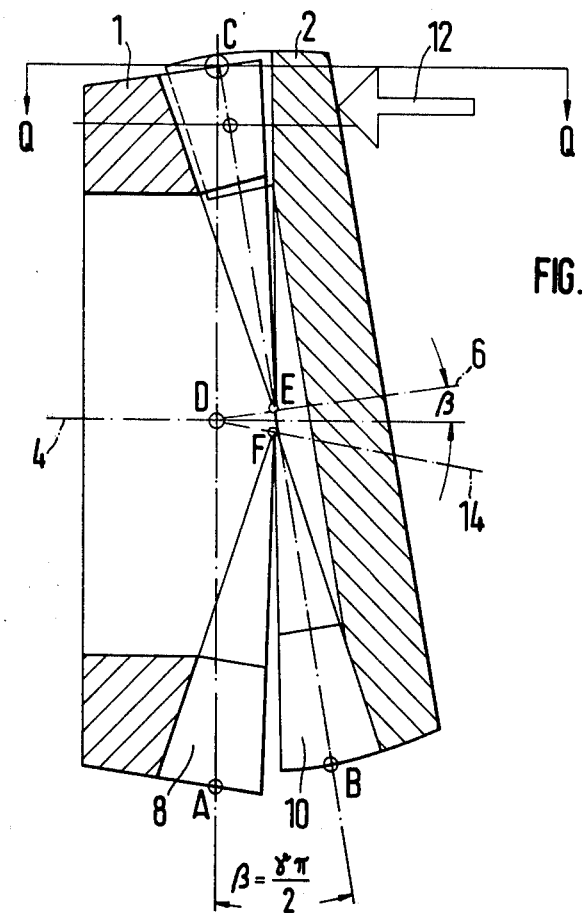
FIG. 1 is a diagrammatic axially-parallel sectional view of two mutually meshing plates of gearing constructed in accordance with the invention.

Referring now to the drawings and first, particularly, to FIG. 1 thereof, there is shown planetary gearing according to the invention, including a swash plate 2 and another plate 1. Respective axes 4 and 6 of the two plates 1 and 2 lie in the illustrated sectional plane of FIG. 1. The angle $\beta$ included by the axes 4 and 6 is equal to the angle $\beta$ which is included, on the one hand, by the radial plane AC of the plate 1 and, on the other hand, the radial plane BC of the swash plate 2. The radial plane AC is located at half the height (see FIG. 5) of the teeth 10 of the swash plate 2. The plate 1 at the left-hand side of FIG. 1 is provided with teeth 8 at the front thereof. From FIG. 1 it can be seen that, within the region wherein both radial planes AC and BC intersect at C, the teeth fully mesh with one another; on the opposite side i.e. in the lower part of FIG. 1, the opposing teeth of the two plates no longer mesh with one another. In order for the plates 1 and 2 to be able to move toward one another, the following equation must be met:

$$L \cdot \tan \beta \geq H$$

where
 $L$ = the diameter of the plates
 $H$ = the height of the teeth
If the equation $L \cdot \tan \beta = H$ is met, then the greatest possible number of teeth is in meshing engagement e.g. the number of nonmeshing teeth equals the difference between the number of teeth of the swash plate 2 and that of the other plate 1. The tooth system resembles a Hirth-type serration system which cannot be used as a gearing or transmission, however, but functions solely as a clutch. An arrow 12 represents a force which presses the teeth together in the vicinity of the point C. If the applied force represented by the arrow 12 describes a circle around the axis 4 of the plate 1, the axis 6 of the swash plate 2 will describe a cone DEF, the cone axis coinciding with the rotary axis 4 of the plate 1. After traversing half a rotation (through 180°), the axis 6 reaches the position indicated at 14. The vertex D of the cone DEF is formed by the intersection of the axes 4 and 6 (or 14). An enlarged diagrammatic view of the cone is provided in FIG. 2. The generating angle of the cone DEF is equal to $2\beta$.

The vertex D of the cone DEF is also that point of the axis 4 of the plate 1 which coincides with the axis 4 of the cone, at which the axis 4 penetrates the radial plane AC. The corresponding point of the swash plate 2 is shown at E. During rotation, the point E describes a circle EF; the point F being the position of the point E after a half rotation (through 180°). The tangent lines at the two flanks, respectively, of each tooth 8 of the plate 1 intersect at points which lie on the circle EF. The tangent lines at all of the flanks of the teeth 10 of the swash plate 2 intersect at the point E, on the other hand.

Visualize a section through both plates 1 and 2, with their teeth intermeshing, within an imaginary cylindrical surface Q—Q which is coaxial to axis 4 and extends through the intersection C of the radial planes ADC and BEC in the upper part of FIG. 1. If this sectional plane of the cylinder is projected onto the plane of the drawing, a representation or view is obtained, of which FIG. 3 is a fragment or portion.

The intersection point C of the sectional plane Q—Q of the cylinder, on the one hand, and the radial planes AC and BC of the plates 1 and 2, on the other hand, previously shown in FIG. 1, is again illustrated in FIG. 3. By projecting the sectional plane of the cylinder on the plane of the drawing, the angle $\beta$ reduces to the somewhat smaller angle $\gamma$; the relationship of the two angles being defined by the equation: $\beta = \gamma \cdot \pi/2$.

In FIG. 3, the teeth of the two rows thereof are represented as triangular teeth with planar flanks. From this figure, it is apparent that the teeth 10 of the lower row thereof (broken lines) project into the spaces between the teeth 8 (solid lines) of the upper row of teeth. Often, the angle $\gamma$ is so small, however, and the number of teeth Z1, Z2 so great that the amount at which the teeth would project into or mesh with one another lies within manufacturing tolerances. In this case, the teeth of both rows of teeth can therefore be formed in triangular shape as shown in FIG. 3.

For larger angles $\beta$ or $\gamma$, as well as for smaller numbers of teeth Z1, Z2 and smaller transmission ratios $i$, accordingly, the shape of the teeth of one row thereof must be corrected, however.

The flank 22 of the tooth 10 of the swash plate 2 should be shaped somewhat convex so that the point of the tooth 10 does not penetrate into or pierce the flank 18 of the tooth 8. The accordingly necessary curvature of the flank 22 of the tooth 10 is obtained in the following manner according to FIG. 4:

a. a perpendicular to a flank 22 of the tooth 10' is constructed in the interior angle 26 formed between two flanks 22, b. a perpendicular to a flank 18 of the tooth 8 is constructed in the interior angle 24 formed between two flanks 18 and c. both of the perpendiculars are extended to a mutual intersection point which is the center of curvature.

The corrected or rectified convex flank of the tooth 10 of the swash plate 2 is a cylindrical surface having an axis that extends perpendicularly to the plane of the drawing of FIG. 3 through the point of intersection of both of the aforementioned perpendiculars. FIG. 4 differs from FIG. 3 in that the teeth 10' of the swash plate 2 have been corrected in the aforementioned manner. The teeth 8 of the plate 1, at the left hand side of FIG. 4, on the other hand, are triangular in cross section with flat or planar flanks 18, just as in FIG. 3.

To produce the teeth of the plate 1 which is coaxial with the cone DEF, reference is made to FIGS. 5 and 6. The cross section of a tooth 8 is shown therein as an isosceles triangle having a base a; the spacing of the points 28 and 30, respectively, of a pair of adjacent teeth 8 is equal as well to the base width a of a single tooth 8. The height H of the teeth is measured from the base to the intersection of the flanks 18, hence without regard to any possible provision of a bevel such as in the embodiment of FIG. 12. Center line X—X is drawn at an elevation H/2 of the teeth 8 of the plate 1. This center line X—X is subdivided by the flanks 18 of the teeth 8 into equal sections a/2 (note also FIG. 4). This uniform subdivision is a prerequisite for a continuous movement free of acceleration. The center line X—X forms the angle $\gamma$ with the center line Y-C of the teeth 10' of the swash plate 2 in the projection or projected view of FIG. 5 (in this regard, also note FIG. 4); the teeth 10' are not illustrated in FIGS. 5 and 6. With respect thereto, it is noted that the center line X—X of the teeth 8 represents the intersection of the radial plane AC with the cylindrical sectional plane Q—Q. The center line Y-C of the teeth 10' represents the intersection of the radial plane B-C with the cylindrical sectional plane Q—Q.

The plate 1 (with a quantity of Z1 teeth) extending coaxially to the cone DEF has more teeth than the swash plate 2 (which has a quantity of Z2 teeth). Correspondingly, the base width $a$ or the spacing $a$ between the points 28 and 30 of the teeth 8 of the plate 1 is shorter by the length $t$ (FIG. 5) than the corresponding spacing $d$ of the swash plate 2. Both base widths $a$ and $d$ are related to one another by the following equation:

$$d = Z1/Z2 \cdot a.$$

It is apparent from FIG. 4 that, as a consequence of the varying numbers of the teeth Z1 and Z2, the teeth of both plates 1 and 2 mesh one with the other with continuously decreasing depth as the distance from the respective teeth to the point C increases. If FIG. 4 were to represent the full extent of both rows of teeth, it would be readily noted that, in the ideal case, the number of teeth of one row thereof that do not mesh with the teeth of the other row is Z1-Z2 (Z1 minus Z2); in any event, almost all of the teeth mesh with one another and very large surface areas are available for torque transmission.

The equation:

$$\gamma = \arcsin\left[\frac{\cos\alpha}{Z1/Z2} \cdot \left(\pm\sqrt{\sin^2\alpha + \left(\frac{Z1}{Z2}\right)^2 - 1} - \sin\alpha\right)\right]$$

wherein $\gamma = 2\beta/\pi$, or the angle between the projected radial planes of the rows of teeth of the swash plate and other plate, respectively, $\beta$ is the angle included by the actual radial planes of the rows of teeth of the respective plates, Z1 = the number of teeth of the other plate 1, Z2 = the number of teeth of the swash plate 2 and $2\alpha$ = the angle included by the flanks 18 or 22 of the teeth, is derived from the triangle CKJ shown in FIG. 5 and also on an enlarged scale in FIG. 7. This equation, in a limiting case wherein $\gamma$ is a small angle i.e. $\gamma < 3°$, transforms to the equation:

$$\gamma \simeq \arctan\frac{n-1}{n \cdot \tan\alpha}$$

wherein $n = Z1/Z2$.

According to this equation, the angle $\gamma$, which is included by the intersecting projected center lines X—X and X-C of the two rows of teeth, may be calculated for the desired ratio $n = Z1/Z2$ of the numbers of teeth in the respective rows thereof and for a given angle $2\alpha$ included between the flanks 18 of teeth 8.

Conversely, for example, starting with a desired angle $\gamma$ and a desired ratio $n = Z1/Z2$ of the numbers of teeth, the angle $2\alpha$ between the flanks 18 of the teeth 8 may be calculated. Both rows of teeth 8 and 10' differ only by the respective numbers of the teeth therein, by the height H of the teeth, as well as by the shape (flat or convex) of the flanks, perhaps.

With reference to FIG. 1, it has been noted hereinbefore that the force symbolized by the arrow 12 presses the teeth within one another in the region C and, due to the fact that the applied force 12 revolves about the axis 4 of the plate 1, a conical movement of the swash plate 2 is effected. This motion mechanism is described in greater detail with respect to FIGS. 5 and 6:

The row of teeth 8 having flanks 18 is shown in a projected view in FIG. 6. Line CX bisects the row of teeth 8. The row of teeth 10, though not shown in FIG. 6, are represented by the bisecting line YY thereof, which breaks at the point C. At the point C, a force 12 presses the two rows of teeth 8 and 10 into one another. If the force 12 were to move in direction of the arrow 13 to the position 912, shown in FIG. 6, a result thereof would be a deviation of the bisecting or center line YY of the row of teeth 10 through the angle $\gamma$ to the position Y1Y1. The flank 22 of a respective tooth 10 would thereby penetrate into a corresponding tooth 8. Since this is impossible from a practical point of view, the teeth 10 are moved toward the right-hand side of FIG. 6 for a distance $t = d-a$ (see FIG. 5), the force 12 being moved a distance equal to the base width d of a tooth 10 toward the left-hand side of FIG. 6 to the position 912.

In the illustrated embodiment, the base width d of the teeth 10 is larger than the base width a of the teeth 8. The result thereof, as hereinbefore noted, is that the teeth 10 are moved in opposite direction (or rotary sense) that that in which the force 12 is moved. Contrarily, if $a$ is larger than $d$, the teeth 10 of the swash plate 2 will shift in the same direction as that in which the force 12 is shifted.

Figure 2:
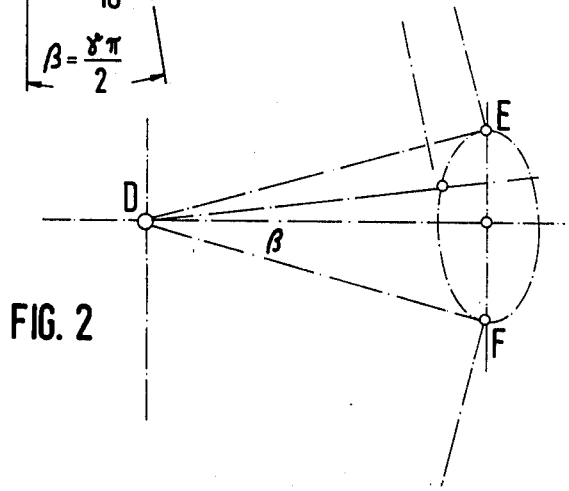
FIG. 2 is an enlarged view of the cone DEF of FIG. 1.

The movement in one plate depicted in FIGS. 5 and 6 serves only as an illustration of the spatial or three-dimensional movement which actually takes place: if the force 12 shifts or revolves on a cylindrical surface about the axis 4 of the plate 1, the axis 6 of the swash plate 2 will, during the conical movement, describe the cone DEF shown in FIG. 2. The teeth 10 mesh with the teeth 8; the intersection C moves from one spacing between two of the teeth 8 to the next, the rows of teeth 8 and 10 being shifted relative to one another a value $t$ (measured in radius) for each movement from spacing to spacing. It is apparent that the transmission ratio $i$ of the rotary speed 13 of the force 12, on the one hand, to the rotary speed of the swash plate 2, on the other hand, equals the ratio of the base width $d$ of one tooth 10 to the shift $t$:

$$i = \frac{ne}{na} = \frac{d}{t} = \frac{d}{d-a}$$

where ne = rotary speed input na = rotary speed output

The input torque Me and the output torque Ma are related one to the other by the equation:

$$ne \cdot Me = na \cdot Ma$$

Figure 8:
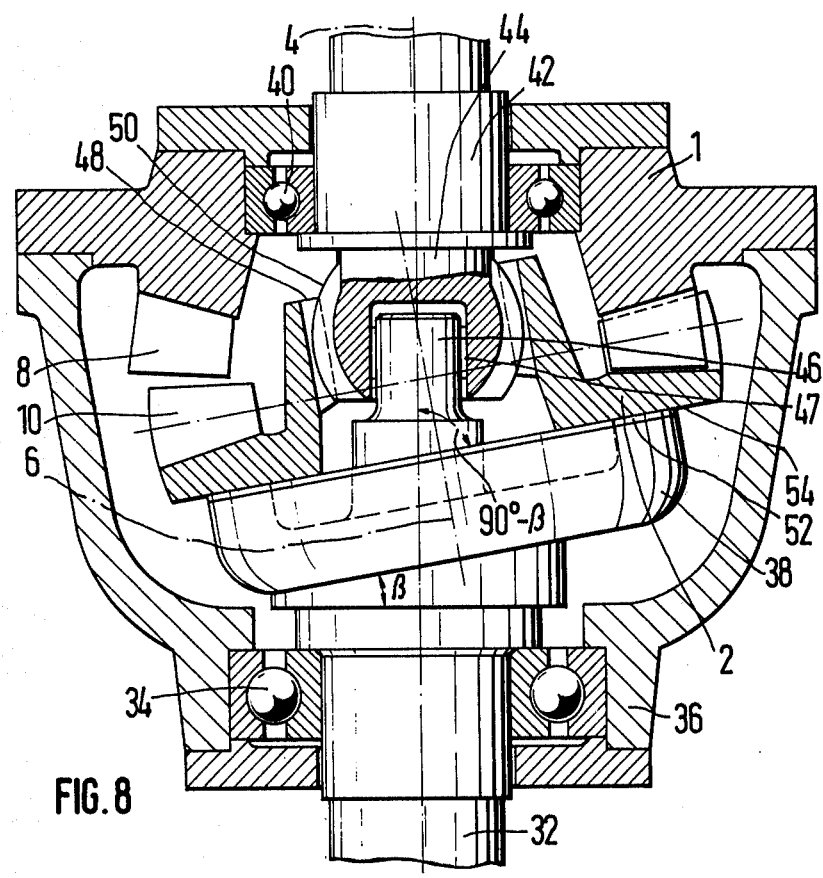
FIG. 8 is a sectional view of one embodiment of the gearing according to the invention having only two plates for transmission of small and medium engine torques.

FIG. 8 shows an especially simplified gearing or transmission constructed in accordance with the invention which has only two plates 1 and 2. Such a gearing is less suitable for the transmission of large torques but is installed rather for transmitting relatively small and medium torques and is used, for example, as adjusting or servo-gearing for large transmissions.

The drive shaft 32 is mounted in a bearing 34 of a housing 36 and carries a bearing plate 38 which is inclined at an angle of $90° - \beta$ with respect to the drive shaft 32.

At the end of the housing 36 (at the top of FIG. 8) a driven shaft 42 is mounted in a bearing 40 in alignment with the drive shaft 32. The drive shaft 32 has an inner free end mounted in a bearing 47 which is located in an inner free end 44 of the driven shaft 42. The bearing 40 is advantageously disposed coaxially to and surrounding the bearing 47.

The plate 1 is firmly connected to the housing 36 and does not rotate. The teeth 10 of the swash plate 2 comb or mesh with the teeth 8 of the plate 1 which is fixed to the housing 36.

The swash plate 2 is provided with internal toothing 48 which combs or meshes with arcuate teeth 50 located at the free end 44 of the driven shaft 42. Through this arcuate-tooth coupling 48, 50, the rotation of the swash plate 2 is transmitted to the driven shaft 42.

When the drive shaft 32 rotates, the bearing plate 38 performs a movement defining the outline of a cone and presses with an annular surface 52 thereof, which is inclined at an angle of 90° $-\beta$ with respect to the drive shaft 32, against an undersurface 54 of the swash plate 2 that is parallel to the annular surface 52; the pressure of the annular surface 52 against the undersurface 54 is represented symbolically in FIGS. 1 and 6 by the arrow 12. Due to the so-called conical movement of the bearing plate 38, the swash plate 2 is urged into conical movement about a cone angle $2\beta$ (note FIG. 2) through the engagement of the surfaces 52 and 54. The rotary speed of the swash plate 2 is considerably lower than the rotary speed of the bearing plate 38; the direction or sense of rotation of the swash plate 2 and the bearing plate 38 may either be the same or opposite, in accordance with the foregoing description relative to FIG. 6. The teeth 10 of the swash plate 2 revolve in the row of teeth 8 of the plate 1 that is fixed to the housing 36, with a rotary speed, the ratio of which to the rotary speed of the drive shaft 32 is determined by the transmission ratio 1 in accordance with the equation:

$$i = \frac{1}{1-n} = \frac{1}{1 - Z1/Z2} = \frac{Z2}{Z2 - Z1}$$

This rotary speed is transmitted by the arcuate-tooth coupling 48, 50 to the driven shaft 42.

During the rotation of the bearing plate 38, a bending moment is exerted on the drive shaft 32. The bending moment is taken up by the hereinaforedescribed bearing of the free end 46 of the drive shaft 32 in the free end 44 of the driven shaft 42.

The teeth 8 of the plate 1 have flat or planar flanks whereas the teeth 10 of the swash plate 2 can be formed with slightly convex flanks as shown in FIG. 8.

Figure 9:
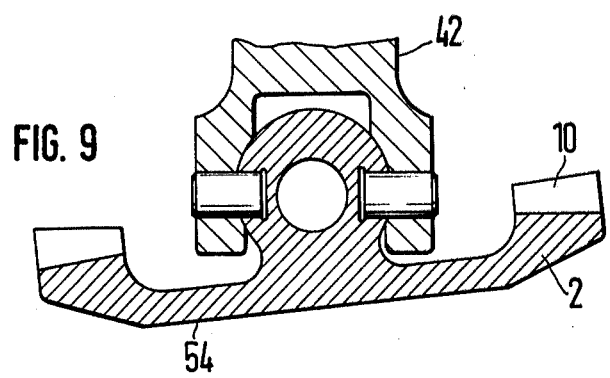
FIG. 9 is a fragmentary view of FIG. 8 showing a modification of a structural detail thereof.

FIG. 9 shows a coupling which may be used, instead of the arcuate-tooth coupling 48, 50 illustrated in FIG. 8, for transmitting the rotation of the swash plate 2 to the driven shaft 42. The arcuate-tooth coupling 48, 50 of FIG. 8 is replaced in FIG. 9 by a cardanic or universal suspension of the swash plate 2 in the driven shaft 42. In this connection, the row of teeth 10 coaxially surrounds the cardanic suspension with the result that the transmission torque is limited. In order to transmit greater torques, the cardanic suspension is advantageously disposed outside or beyond the row of teeth 10.

Figure 10:
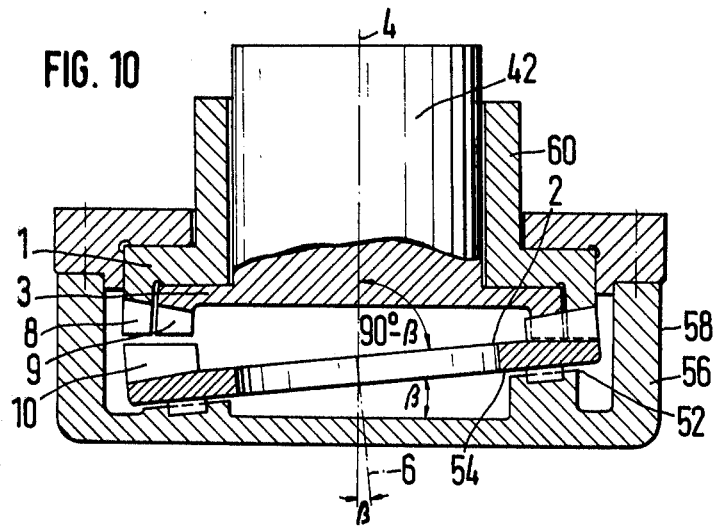
FIGS. 10 and 11 are sectional views of other embodiments of FIG. 8, each showing two gears with three plates for transmission of high engine torques, the gears shown in FIG. 11 being provided with especially sturdy bearings.

A gearing arrangement having a total of three plates is shown in FIG. 10. No arcuate-tooth coupling, cardanic suspension or the like is required, so that large torques can be transmitted.

In the embodiment of FIG. 10, rotary motion is introduced through a drive gear 56 into the gearing arrangement. The drive gear 56 can be provided, for example, on the cylindrical surface 58 thereof with a V-belt or with suitable toothing for the use of a gearwheel drive. Also, the drive gear 56 can carry a drive shaft or can be constructed as a handwheel. On the inside thereof, the drive gear 56 is formed with a sloping annular surface 52 which is inclined at an angle $\beta$ with respect to the drive gear 56, the annular surface 52 describing a conical movement with a generating or cone angle of $2(90° - \beta)$ and pressing against the undersurface 54 of the swash plate 2 in such a manner that the axis 6 of the swash plate 2 describes a conical movement with a generating or cone angle of $2\beta$ (note FIG. 2).

The teeth 8 and 9 of both mutually coaxial plates 1 and 3, respectively, comb or mesh with the teeth 10 of the swash plate 2. The mathematical axis 4 of both plates 1 and 3 is also the mathematical axis of the drive gear 56 as well as of whatever drive shaft may be provided therefor. The shafts 4 and 6 mutually include the angle $\beta$.

The numbers or quantities of teeth Z1, Z3 and Z2 of the respective plates 1, 3 and 2 differ from one another. The number Z1 of the teeth of the outer plate 1 is greater by a whole number $q$ than the number Z2 of the teeth of the swash plate 2, the number Z3 of the teeth of the inner plate 3 is smaller by the same whole number $q$ than the number Z2 of the teeth of the swash plate 2 (or vice versa). Only under the foregoing pre-condition are the angles $\beta$ and $\gamma$ virtually equal for the ratio of the plates 1 and 2, on the one hand, and the ratio of the plates 3 and 2, on the other hand. Depending upon whether the outer plate 1 or the inner plate 3 of both mutually coaxial plates 1 and 3 is connected to the housing and is thereby held fast, two different transmission ratios between the rotary drive speed of the driving gear 56, on the one hand, and the rotary driven speed of the plate 1 or 3, that is not held fast, on the other hand, are obtained.

According to FIG. 10, the inner plate 3 carries a drive shaft 42 which is coaxially surrounded by a hollow driven shaft 60 of the outer plate 1. Depending upon which of the two coaxial plates 1 or 3 is held fast, the driven rotation is to be taken off the other of the two coaxial plates 1 or 3 or either off the driven shaft 42 or the driven hollow shaft 60.

Each tooth 10 meshing with the teeth 8 and 9 of the coaxial plates 1 and 3, respectively, engages by the flanks thereof one tooth 8 and one tooth 9. The forces exerted by both teeth 8 and 9 on the tooth 10 counterbalance one another. The pressure on each of the two flanks is equal if the areas of the flanks of these teeth as well as the radii of the plates satisfy the following equation:

$$F1 \cdot r1 = F3 \cdot r3$$

where

F1 and F3 = the respective areas of the flanks of the teeth 8 and 9; and r1 and r2 = the respective radii of the plates 1 and 3.

It is noted that the three plates 1, 2 and 3 are not mounted in radial bearings but are centered one within the other. Construction costs for the gearing or transmission is thus kept very low. This advantage applies to all of the embodiments of the gearing or transmission of the invention in the instant application.

Assuming that with the embodiments of the gearing shown in FIGS. 8 and 9, the numbers of teeth are Z1 = 60 and Z2 = 59, respectively, then the transmission ratio $i$ is calculated as follows:

$$i = \frac{1}{1-n} = \frac{1}{1 - Z2/Z1} = \frac{Z1}{Z1 - Z2} = \frac{60}{60 - 59} = 60$$

If the numbers of teeth of the gearing arrangement shown in FIG. 10 are Z1 = 60, Z2 = 59 and Z3 = 58, the transmission ratio $i$ is calculated as follows:

a. with the inner plate 3 held fast or locked:

$$n = \frac{Z3}{Z2} \cdot \frac{Z2}{Z1} = \frac{Z3}{Z1}$$

$$i = \frac{1}{1-n} = \frac{1}{1 - Z3/Z1} = \frac{Z1}{Z1 - Z3} = \frac{60}{60 - 58} = \frac{60}{2} = 30$$

b. with the outer plate 1 held fast or locked:

$$n = \frac{Z1}{Z2} \cdot \frac{Z2}{Z3} = \frac{Z1}{Z3}$$

$$i = \frac{1}{1-n} = \frac{1}{1 - Z1/Z3} = \frac{Z3}{Z3 - Z1} = \frac{58}{58 - 60} = \frac{58}{-2} = -29$$

The gearing arrangement of FIGS. 8 and 9, which is preferably usable for transmitting relatively small and medium torques, has a relatively high transmission ratio. In contrast thereto, the embodiment of FIG. 10, which is suited for transmitting relatively large torques, has a relatively low transmission ratio. Depending upon which of the four rotary members, namely the three plates 1, 2 and 3 and the drive gear 56, of the gearing of FIG. 10 is held fast or locked and which of these four rotary members are driven, 10 different transmission ratios are possible:

| locked member | driven member | transmission ratio: $i = \frac{1}{2}$ | $i = \frac{1}{3}$ | $i = \frac{1}{4}$ |
|---|---|---|---|---|
| 1 | 56 | 30 | | 60 |
| 3 | 56 | (−)29 | (−)58 | |
| 2 | 56 | 30/(−)29 | | |
| 56 | 1 | 1.038 | | 1.017 |
| 56 | 3 | 0.96 | 0.98 | |
| none | 1 or 2 | 1 | 1 | 1 |

The gearing embodiment resembles that of FIG. 10 insofar as two mutually coaxial plates 1 and 3, which are also coaxial to the driven shaft 42, comb or mesh with a swash plate 2. The embodiment of FIG. 11 differs from that of FIG. 10 mainly in the more solid or massive construction of the bearing.

Rotation is introduced through the drive shaft 32 which is mounted in the bearing 34 in the housing 36. The driven shaft 42 is mounted in the bearing 40 in the housing 36. The drive shaft 32 has a free end 46 which extends into the hollow interior of the driven shaft 42 to the vicinity of the bearing 40 and is mounted there in the bearing 47. The bending moments exerted on the drive shaft 32 by the conical movement of the bearing plate 38 are transmitted in this manner through the bearings 34, 47 and 40 to the housing 36.

The sloping annular or ring-shaped surface 52 of the bearing plate 38 is inclined at an angle of $90° - \beta$ with respect to the drive shaft 32 and presses against the undersurface 54 of the swash plate 2 and drives the latter in a conical movement about the axis 6 thereof. The row of teeth 10 of the swash plate 2, in this connection, meshes with and travels in the row of teeth 8 of the outer plate 1 which is firmly connected to the housing 36. A consequence thereof is that the inner plate 3 is rotated by the conical rotary movement (about the axis 6) of the swash plate 2. The inner plate 3 is firmly connected to the driven shaft 42, the rotary speed of which with respect to the rotary speed of the drive shaft 32 constituting a transmission ratio which is determined by the number of teeth in the plates 1 and 3 and eventually the plate 2.

The bearings 34, 40 and 47 absorb the forces acting radially to the shafts 32 and 42. To divert or absorb forces acting in longitudinal direction of both of these shafts 32 and 42, on the one hand, the bearing plate 38 is supported by a support bearing 102 within and at the bottom of the housing 36, as shown in FIG. 11, and on the other hand, the plate 3 is supported by a support bearing 104 within and at the top of the housing 36.

Figure 12:
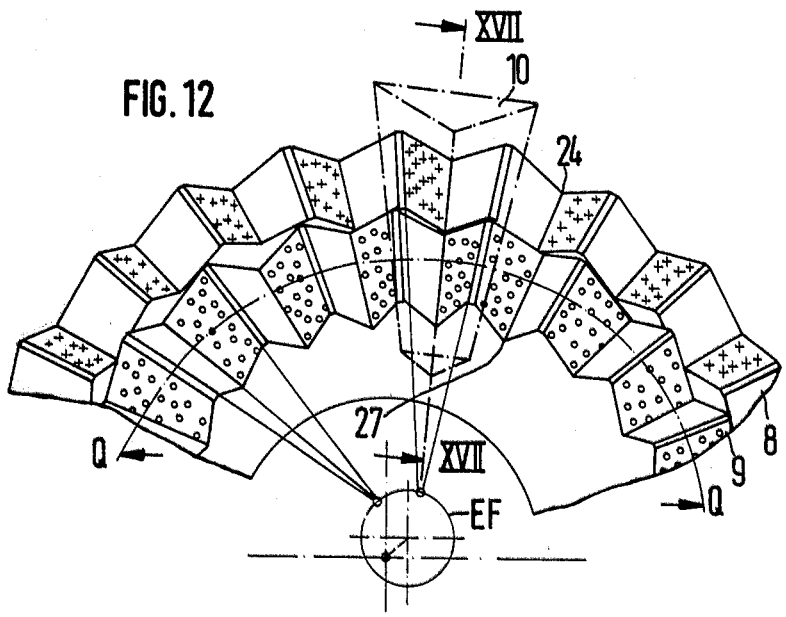
FIG. 12 is a diagrammatic plan view of the two rows of teeth of the two coaxial plates of the embodiment of FIG. 10.
Figure 11:
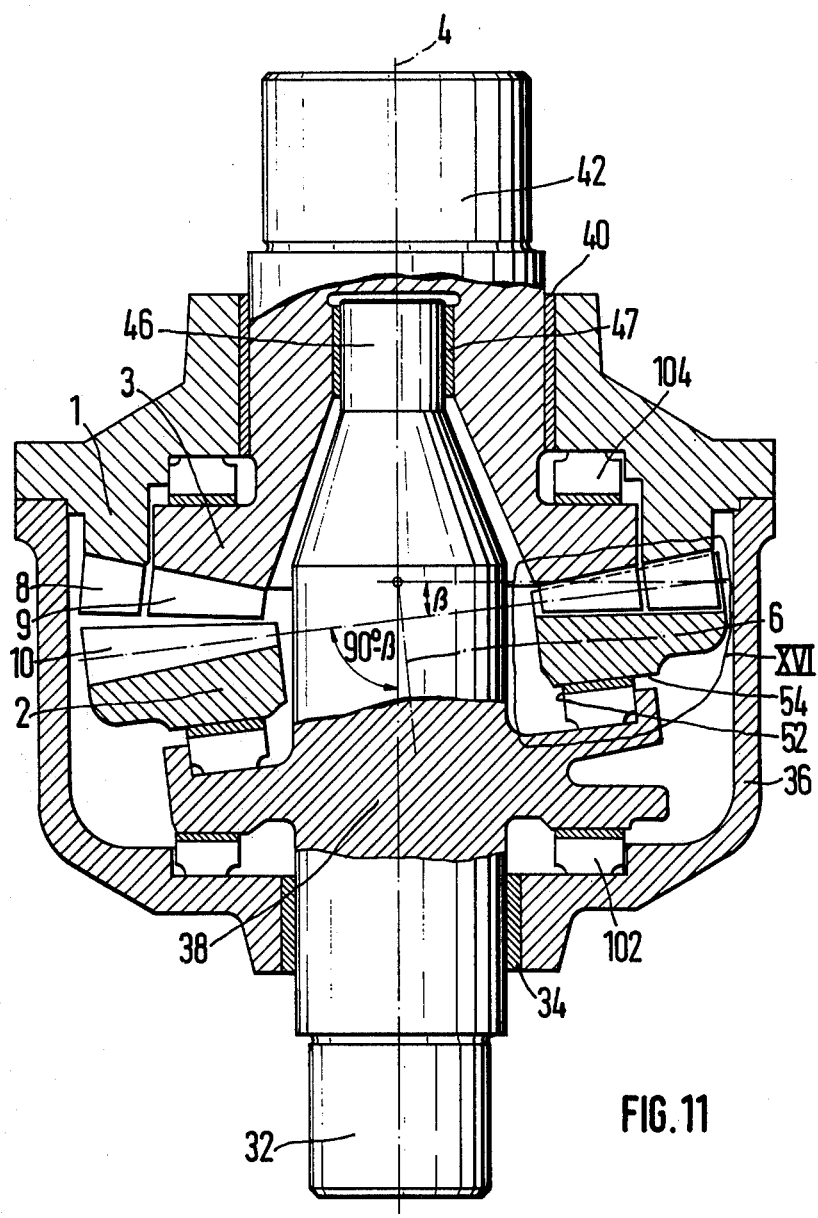

FIG. 12 is a diagrammatic top plan view of somewhat one-third of the rows of teeth 8 and 9 of the mutually coaxially disposed plates 1 and 3 of FIGS. 10 and 11. It is apparent from FIG. 12 that the interior angles 24 and 27 of both rows of teeth 8 and 9, respectively, are aligned with one another at only one location as a result of the different numbers of teeth thereof; it is at just that one location that a tooth 10 of the swash plate 2 is shown in phantom to demonstrate how this tooth 10 meshingly overlaps both rows of teeth 8 and 9.

Those flat or planar flanks of the teeth 8 and 9, which grip or enclose a respective tooth 10 are identified, respectively, by multiplicities of small circles and crosses. The flanks of these teeth 10 may be of slightly convex construction in order always to afford engagement of the flanks by the teeth 8 and 9 in accordance with FIG. 4.

Both rows of teeth 8 and 9 form one with the other a virtual row of teeth, the flanks of which, on the one hand, are formed of the flanks marked with small crosses and, on the other hand, are formed of the flanks marked with small circles. The teeth 10 of the swash plate 2 are pressed into this virtual row of teeth by the revolving inclined annular surface 52 (FIGS. 10 and 11). One of the teeth 10 is slid, respectively, into one of the spacings in the virtual row of teeth and thereby forces the flanks of the virtual row of teeth apart. This causes relative movement of the plates 1 and 3 toward one another or, if one of the two plates 1 and 3 is held fast or locked, rotary motion of the other is produced. (A second virtual row of teeth is formed of the flanks that are not marked by crosses or circles. This second virtual row of teeth is identical to the first virtual row of teeth except that it is displaced or shifted the extent of one angle. Instead of the first-mentioned virtual row of teeth employed in FIG. 12, the second virtual row of teeth may be used, in which case only the rotary sense or direction would be changed. Hereinafter, reference is made only to a single virtual third row of teeth which is utilized. It is possible, however, to utilize simultaneously both virtual rows of teeth. With respect thereto, reference is made to the description of FIG. 27 herein.)

The essential structural differences between the Hirth gearing or transmission and the gearing arrangement of the invention in the instant application are apparent from the diagrammatic perspective view of FIG. 12.

1. The three rows of teeth 8, 9 and 10 have different numbers of teeth.

2. The extensions of the interior angles 24 and of all the flank lines (for example, the vertical or elevation bisectors AF and EC of FIG. 1) of each tooth of the plates 1 and 3 intersect at points located on a circle EF which represents the base line of the cone shown in FIG. 2, whereas the corresponding points of intersection of the swash plate 2 provided with the teeth 10 substantially coincide at a single point E or F which revolves on the circle EF.

Figure 13:
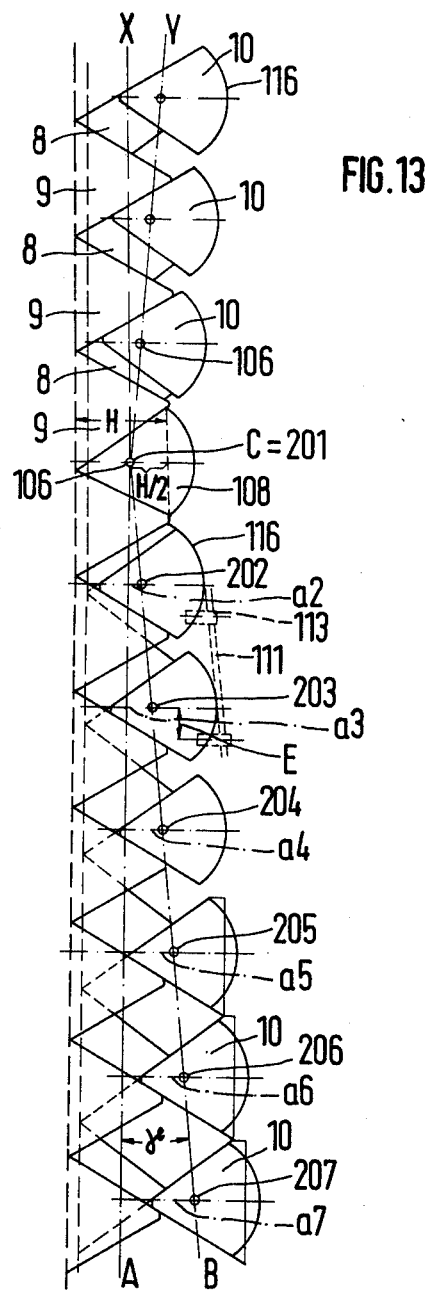
FIG. 13 is a diagrammatic projected view of the two mutually meshing plates with tiltable teeth.

Instead of the convex shape of the teeth 10, as described with respect to FIGS. 3 and 4, it is advantageously possible to construct the teeth 10 so that they are pivotal in accordance with FIG. 13.

FIG. 13 presents a view similar to that of FIG. 4, namely a section longitudinal to a sectional plane Q—Q of a cylinder as presented in FIG. 12, which is then developed in the plane of the drawing. Between the flat or planar flanks of respective pairs of teeth 8 and 9, a respective tooth 10 of the swash plate 2 is seated, the tooth 10 being pivotable or tiltable about a pivot axis 106 (symbolically represented by a small circle). Since the pivotable tooth 10 is engaged from both sides thereof by a respective applied flank (FIG. 12) of a respective tooth 8 or 9, no tilting or tipping movement acts upon the pivot axis 106. Thus, no damage exists of possible bending or twisting of the pivot axis 106. The pivotable tooth 10 is loaded or stressed in shear at the location whereat the engagement thereof by the tooth 8 merges into the engagement thereof by the tooth 9.

FIG. 14 is an enlarged fragmentary view of FIG. 11 showing a detail thereof included within the enveloping line XVI but, however, providing a pivotable arrangement of the tooth 10. It is apparent therein that the conically shaped pivot shaft 106' has ends 107 and 108 by which it is mounted in bearings 109 and 110 provided in the swash plate 2. The teeth 8 and 9 of the mutually coaxial plates 1 and 3 are shown in broken lines.

A view of the pivotable tooth of FIG. 14 in direction of the pivot axis 106 thereof is provided in FIG. 15. The view is toward the end 108 of the pivot shaft 106 that is mounted in the bearing 110. Further visible in FIG. 15 is the flange 114 behind which the conical section of the shaft 106 begins and finally terminates in the rear end 107 represented as an inner broken-line circle. The tooth 10 per se becomes narrower from the outside toward the inside. The outer triangular outline of the tooth 10 is identified at 103 in FIG. 15, the inner triangular outline of the tooth 10 is identified at 105 in FIG. 15.

It is apparent that both flanks of the outline 103 and both flanks of the outline 105 would intersect at a respective point at the right-hand side of FIG. 15 but that these points have, however, been chamfered. A respective base line $d$ 103 and $d$ 105 is associated with the outlines 103 and 105. WIth respect to the outline 103, the distance between the point of intersection of both flanks and the base line $d$ 103 is the height or altitude H 103; correspondingly, with respect to the outline 105, the distance between the intersection point of both flanks and the base line $d$ 105 is the height or altitude H 105. Both altitudes H 103 and H 105 are exactly bisected by the mathematical axis 106 of the pivot shaft 106' of the pivotable tooth 10. This bisection H/2 is also indicated in FIG. 13.

Figure 16A:
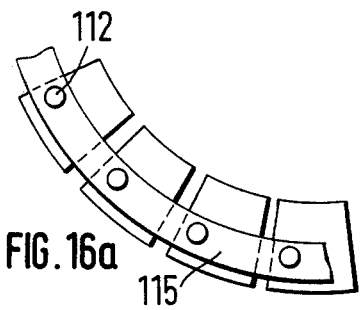
FIGS. 16a and 16b are fragmentary plan views of a toothed plate including tiltable teeth such as that of FIG. 14, FIG. 16b also showing means for controlling the tilting of the teeth.
Figure 16B:
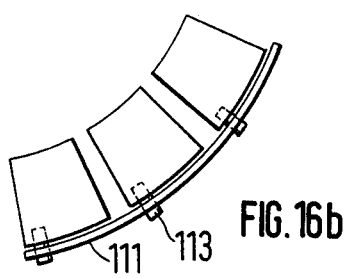

It has been noted hereinbefore that each pivotable tooth must be supported at both flanks thereof by a respective flank of a tooth 8 or 9 so that it does not oscillate in an undefined manner about the pivot axis 106 thereof. This condition is always fulfilled for those teeth 10 which mesh with the mutually coaxial rows of teeth. This condition is not fulfilled, however, for those few teeth which (note FIG. 1, at the bottom thereof) do not mesh with other teeth. These teeth might oscillate or swing about the pivot axes 106 thereof in an undesired manner, so that they, after further rotation, would not be located again immediately in suitable position in which they would fit into the spaces between two teeth 8 and 9. This could cause malfunction, which can be avoided, however, by the control devices shown in FIGS. 16a and 16b:

Each pivotable tooth 10 carries a pin 112 or 113 which is loosely seated in an opening or recess formed in a guide ring 115 (FIG. 16a) attached to the face of the teeth 10 or in an opening or recess formed in a guide ring 111 attached peripherally at the outside to the teeth 10. The particular disposition of the respective guide ring 115, 111 at either the face of the teeth 10 or peripherally at the outside to the teeth 10 is selected depending upon where space for the respective guide ring may be available. The position of the angle of the meshing teeth 10 is imparted to the few non-meshing teeth so that the latter, when they again mesh, are located from the very beginning in the correct setting.

If the numbers of teeth in the rows of teeth 8 and 9 are very different, it may be necessary to provide different angles $2\alpha$ between the flanks of the teeth (note FIG. 5) for both rows of teeth 8 and 9.

This angle $2\alpha$ must then differ to the same extent for both portions 10a and 10b (note FIG. 17) of the pivotable tooth 10. In this case, it may be desirable from the standpoint of production technology, to construct the portion 10a of the pivotable tooth 10 and the pivot shaft 106' in one piece so that the portion 10b is pivotable with respect to the pivot shaft 106' and, accordingly, with respect to the portion 10a. Thus, in this embodiment, the portions 10a and 10b of the tooth 10 pivot independently of one another.

Figure 18:
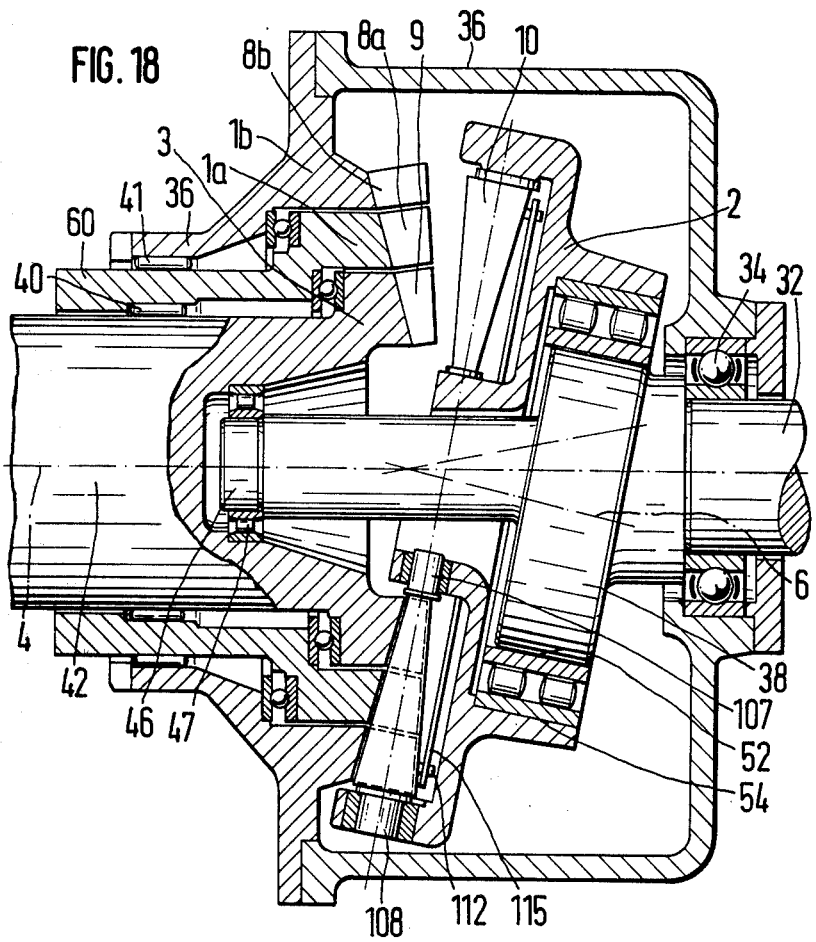
FIG. 18 is a sectional view of another embodiment of FIG. 8, showing gearing with three coaxial plates and special means for introducing the driving engine torque.

In the embodiment of the gearing or transmission shown in FIG. 18, the drive shaft 32 in the housing 36 is mounted in a bearing 34. The inner free end 46 of the drive shaft 32 is mounted with a bearing 47 in the hollow end of the driven shaft 42 which is disposed coaxially to the drive shaft 32 (the mathematical axis 4).

The inner plate 3 of three coaxial plates 1a, 1b and 3 and the drive shaft 42 are constructed in one piece. The middle plate 1a of the three coaxial plates 1a, 1b and 3 and a driven hollow shaft 60 are constructed in one piece, while the outer plate 1b of the three coaxial plates 1a, 1b and 3 and the housing 36 are of one-piece construction so that the outer plate 1b is thereby held fast or locked. The driven shaft 42 is mounted by means of a bearing 40 in the driven hollow shaft 60, whereas the driven hollow shaft 60 is mounted in a bearing 41 in the housing 36. The three rows of teeth 9, 8a and 8b of the three mutually coaxial plates 1a, 1b and 3 comb or mesh with the pivotable teeth 10 of the swash plate 2. These pivotable teeth 10 are mounted in the swash plate 2 as shown in FIG. 14. Also shown in FIG. 18, is the control device 112, 115 of FIG. 16a which maintains in suitable setting those teeth 10 which do not mesh with the teeth 9, 8a and 8b (at the right-hand side of FIG. 18), so that they, when meshing again after being further rotated, are immediately located in the correct position and do not disrupt the course of movement.

In the hereinbefore described embodiments of the invention, the surfaces 52 and 54, with which the conical movement of the bearing plate 38 is transmitted to the swash plate 2, were disposed parallel to the bearing plate 38. In the embodiment of FIG. 18, however, the surfaces 52 and 54 are disposed parallel to the axis 6 of the swash plate 2, in order to show, in at least one embodiment of the invention, this possible construction also, which affords advantages in construction for relatively large angles $\beta$.

As mentioned hereinbefore, it may be desirable, especially for high rotary speeds and low transmissions, to improve the quietness of running without increasing the necessary precision. In the case of high rotary speeds and low transmissions, this quietness of running is disturbed by the fact that the angle β increases when the transmission ratio decreases and, consequently, the diameter of the circle EF becomes larger. Through the various constructions according to the invention shown in FIGS. 20 to 31, it is possible to reduce the diameter of the circle EF. This means that the point D in FIG. 2 is shifted in direction toward the circle EF and, in the extreme case, that the entire cone DEF collapses into or coincides in one point. The generating angle of the conical movement of the swash plate 2 is maintained unchanged, in that case, except for a possible correction in which it is reduced by Δβ calculated from the equation:

$$\sin\Delta\beta = (2\ \pi/n \cdot \sin\gamma$$

wherein $n$ = the number of teeth of the virtual row of teeth. The problems occuring with respect to the meshing of the teeth 10 of the swash plate 2 in one of the two virtual rows of teeth are solved by features of the invention hereinbefore described as well as claimed in various of the claims herein.

FIG. 19 shows on an enlarged scale the triangle ACB of FIG. 1. The radial plane BC is the vertical or altitude bisector of the row of teeth 10. A circular arc is constructed above the line BC i.e. the plane bisecting the teeth 10 in half elevation is unfolded at the right-hand side of FIG. 19. The point of intersection of the tooth bisectors (the plane of the drawing) with the tooth verticals are indicated on the circular arc by small circles 201, 202, 203, 204, 205, 206, 207 and 208. These points 201 to 208 are projected onto the line BC and produce thereat the points 201', 202', 203', 204', 205', 206', 207' and 208', respectively, which are also marked by small circles.

FIG. 13 shows, on the one hand, the development or projection of the virtual row of teeth formed by the teeth 8 and 9 and, on the other hand, the meshing teeth 10 of the swash plate 2. The feet 116 of the teeth 10 of the swash plate 2 are spherical to suggest the rotatable disposition thereof which will be explained in detail hereinafter with respect to FIG. 23.

The point 201 coincides with the point C on line CA i.e. the radial planes of the coaxial plates 1 and 3, on the one hand, and of the swash plate 2, on the other hand, intersect at this point. As shown in FIG. 13, however, the point 202 is spaced a distance $a2$ from the line CA. If this distance $a2$ from the radial planes AC of the coaxial plates 1 and 3 to the radial plane BC of the swash plate 2 is transferred from FIG. 13 to FIG. 19, the point 202' lying on line CB is not reached but rather, the point located adjacent thereto, which is marked with an X. Correspondingly, if the spacing $a3$ is transferred to FIG. 19, another point marked with an X is reached, and so forth. It is apparent that the points marked with an X in FIG. 19 deviate slightly from the corresponding points 201' to 208'. These slight deviations are negligible and do not generally require any consideration. Only when the numbers of teeth are small do those deviations have any significance. A first corrective measure is to correct the angle β and thereby dispense with a torque transmission through the tooth which is indicated by the small circle 201. A construction results therefrom which differs from that of FIG. 1 by an angle β which has been reduced by a corrective factor Δβ.

In accordance with the invention, another solution is provided for correcting these deviations of the points 202' to 208' from the points marked by an X, through the mobility of the teeth 10 of the swash plate 2 and/or the coaxial plates 1 and 3.

FIG. 20 shows gearing, similar to that of FIG. 11, however, the teeth 10 of the swash plate 2 have been disposed somewhat differently, as is illustrated more distinctly in FIGS. 21 and 22. The bearing plate 38 is constructed out of one piece with the drive shaft 32 or is rigidly secured thereto. A roller bearing 53 is disposed between the bearing plate 38 and the undersurface 54 to reduce the friction. The rotary movement of the bearing plate 38 is thus transmitted through the roller bearing 53 to the swash plate 2. Each incividual tooth is disposed on the swash plate 2 in accordance with the representation thereof in FIG. 21.

As shown in FIGS. 20 and 21, a packet of plate or cup springs 701 are disposed so that the axis thereof is parallel to the axis 6. As further shown in FIGS. 21 and 22 and, even more clearly in the sectional view of FIG. 24, the swash plate 2 carries a pivotal bearing bed 705 on a support plate 703. The tooth 10 bears with the spherical foot 116 thereof in the pivotal bearing bed 705. The tooth 10 is movable in the directions of the curved double-headed arrow 707, the curvature of the foot 116 being such that pivoting or tilting about the axis 709 occurs, which bisects the pivot tooth 10 in the elevation or height thereof. Strictly speaking, the pivotal bearing bed 705 pivots about the tooth 10, which remains exactly in the spaces of the virtual row of teeth.

The plate or cup springs 701 press the pivotable tooth 10 in direction of the axis thereof, parallel to the axis 6 of the swash plate 2 into the virtual row of teeth as shown in perspective in FIG. 12.

FIG. 22 is a plan view of the support plate 703 on which three pivotal bearing beds 705 are shown. A pivot tooth 10 indicated by stippling is represented in the middle pivotal bearing bed 705. The plate or cup springs 701 are indicated by the circles shown in broken lines in FIG. 22.

In order that the pivotable tooth 10 does not travel radially outwardly (upwardly in FIG. 21) or in order to prevent the pivotable tooth 10 from falling out while it is being installed, a holding or support plate 711 is provided into which a shaft 713 of the pivot tooth 10 is inserted with relatively large clearance. The axis of the shaft 713 although, in fact, in alignment with the (mathematical) pivot axis 709, has nothing to do, however, with the pivoting or tilting of the tooth, which is effected exclusively by the bearing in the bed 705 according to FIG. 24.

In FIG. 20, the teeth 8 and 9 of the plates 1 and 3 which are coaxial with the axis 4, are rigidly disposed on these plates 1 and 3. In accordance with the embodiment of FIG. 23, however, cylindrical bores 901 and 903 are formed in the coaxial plates 1 and 3, the axes of the cylindrical bores 901 and 903 being oriented perpendicularly to the tooth bisectors. Hollow pistions 905 and 906 are slideably disposed in the cylindrical chambers or bores 901 and 903 and carry the teeth 8 and 9. Springs 908 and 910 are disposed between the base of the cylinder chambers or bores 901 and 903, on the one hand, and the hollow pistons 905 and 906, on the other hand. The springs 908 and 910 may be formed as rubber cushions, as plate or cup springs or, for example, as helical springs, and the teeth 8 and 9 of both coaxial plates 1 and 2 press against the flanks of the pivotable teeth 10 (FIG. 10) of the swash plate 2. The virtual row of teeth, which is formed of the teeth 8 and 9, thus automatically accommodates or adjusts itself to the row of the pivotable teeth 10. In this case, it is not necessary to dispose these teeth 10 so that they are shiftable as in FIG. 21, but rather, the pivotability or tiltability of the teeth 10 is sufficient. The force of the springs 908 and 910 is adjusted in such a manner that the desired pressure between the flanks of the virtual row of teeth, on the one hand, and the flanks of the pivotable or tiltable teeth 10, on the other hand, is attained.

As mentioned hereinbefore, the chambers or bores 901 and 903 are cylindrical. A result thereof is that the teeth 8 and 9 are shiftable not only in direction of the axes of the cylindrical chambers 901 and 903 but are also rotatable about these axes. The automatic accommodation or adjustment of the virtual row of teeth to the row of the pivotable teeth 10 is improved to absolute perfection.

A plan view of the two rows of teeth 8 and 9 is provided in FIG. 25, from which it is apparent that each tooth is rotatably and shiftably disposed individually in the manner illustrated in FIG. 23.

Inconsistencies or variances in the angle $\beta$ between the axes 4 and 6 are completely equalized by means of the embodiment of FIG. 23.

FIGS. 26, 27 and 28 shown various other embodiments of the pivotable teeth 10 of the swash plate 2, in accordance with the invention.

In FIG. 26, the tooth 10 is mounted in the pivotal bearing bed 705. If it is shifted radially inwardly in direction of the rotary axis 709 thereof, it will mesh more deeply with the virtual row of teeth. If the tooth 10 is shifted radially outwardly, on the other hand, it will mesh less deeply with the virtual row of teeth. These shiftings or displacements in direction of the axis 709 can be effected in any conceivable manner. According to FIG. 26, the tooth 10, during the rotary movement thereof, slides on a cam plate 121 which is so constructed that the tooth 10 is pressed in the required manner radially inwardly and thereby into the virtual row of teeth. Where this is not required, the cam plate 121 gives way or yields and permits the tooth 10 to be pressed out of the virtual row of teeth.

In the embodiment of FIG. 26, the cam plate 121 is a hollow plate encircling or surrounding all of the pivotable teeth. In FIG. 27, on the other hand, which illustrates an especially advantageous embodiment, the cam plate 380 is disposed parallel to the swash plate 2. The cam plate 380 corresponds to the bearing plate 38 of FIG. 20. A slide bearing 153 is disposed between the cam plate 380 and the bearing shoe 131. A pin or bolt 133, which carries the pivotal bearing bed 705, reposes in the bearing shoe 131.

When the cam plate 380 rotates, the teeth 10 shift more or less deeply into the virtual row of teeth. The swash plate 2, in this case, need not necessarily execute rotary motion, but rather, the shifting of the teeth 10 into the virtual row of teeth is sufficient in principle. At the location where the virtual row of teeth presses the pivotable teeth 10 back again, the cam plate 380 is suitably formed in order to permit such a pressing-back.

FIG. 28 shows a gearing in accordance with the invention wherein each individual tooth 10 is pivotally or tiltably mounted and, in fact, also in this case, in a pivotal bearing bed 705. This pivotal bearing bed 705 is seated on a spherical part or calotte 143 of a respective pin 141 and 142 which is braced against a cam plate 380 through roller bearings (roller 145, thick shaft 147). This cam plate 380 effects a reciprocating motion of all the pins or bolts 141, 142 and so forth, parallel to the axis 4 of the coaxial plates not shown in FIG. 28. The guide plate 103 is not required to rotate, in this connection (note FIG. 26). Due to a desired formation of the cam plate 380, it is possible to achieve an absolutely exact meshing of the pivotable or tiltable teeth 10 in a virtual row of teeth, the teeth 8 and 9 of which being rotatably and axially displaceably disposed in accordance with FIG. 23. Furthermore, the cam plate 380 may be so constructed that one part of the teeth 10, advantageously half thereof, meshes in one of the two virtual rows of teeth, and the other part of the teeth 10, advantageously the other half thereof, meshes in the second virtual row of teeth. Thus, a balanced system, the best in every respect, and a uniform loading and wear are achieved. It is also conceivable that more than two, for example three or four, coaxial plates may be used. Three or four virtual rows of teeth would then be obtained. To achieve uniform use or employment thereof, advantageously one-third or one-fourth of the teeth 10 of the swash plate 2 should mesh with the one of the three of four virtual rows of teeth.

Instead of the spring-biased teeth, whether the spring-biased teeth 8 and 9 of the coaxial plates 1 and 3 according to FIG. 9 or the spring-biased pivotable or tiltable teeth 10 according to FIG. 21 a zigzag-shaped metal sheet according to FIG. 29 can be used. For high transmissions, the pivotability or tiltability of the teeth 10 is adequately superseded or replaced by the elastic workability or deformability of the zigzag-shaped metal sheet.

The upper part of FIG. 29 illustrates the unwinding of part of the zigzag-shaped metal plate, the lower part of FIG. 29 is a section taken along the line A—A in the upper part of the figure. The zigzag-shaped metal sheet is seated directly on the plate 1, 2 or 3.

FIG. 30 shows the disposition of individual teeth 10 of the swash plate 2 on an elastic pad 161. This arrangement is suited especially for high transmissions that are greater than 20. The teeth 10 are somewhat impressibly and somewhat pivotally or tiltably mounted on the elastic pad 161. Within given limits, this construction achieves, by less costly means, virtually that which is achieved by the costlier construction of FIG. 21 wherein the pivotability or tiltability in the pivotal bearing bed 705 is separated from the shiftability by means of the plate or cup springs 701.

FIG. 1 discloses another embodiment of the gearing or transmission according to the invention wherein rotary motion is introduced through a shaft 171 to the gearing. The annular or ring-shaped surface 52 of the drive gear 56 presses against the undersurface 54 of the swash plate 2 and effects the rotation of the latter. The teeth 8 and 9 of the coaxial plates 1 and 3 comb or mesh with the teeth 10 of the swash plate 2. The inner plate 3 carries another row of teeth 9a on the rear side thereof, the other row of teeth 9a bearing a mirror-immage relationship to the row of teeth 9 on the opposite side of the plane A—A thereto in FIG. 31. A plate 1a correspondingly coaxial to the outer coaxial plate 1, which is rigidly secured to the housing, is disposed in mirror-image fashion with respect to the plane A—A, the plate 1a having teeth 8a combing or meshing, much like the teeth 9a, with the teeth 10a of another swash plate 2a. A second drive gear 56a, which drives the swash plate 2a, is seated on the drive shaft 171. The swash plates 2 and 2a are rotated at varying angular velocities. The driven rotation is taken off or absorbed by the teeth 8a of the coaxial plate 1a e.g. the coaxial plate 3 is unipartite, whereas two separated coaxial plates 1 (with the teeth 8) and 1a (with the teeth 8a) are to be distinguished. The plates 1 and 1a could be combined and, instead of the plate 3, two separated plates 3 and 3a provided.

The force flow thus travels from the teeth 10 through the teeth 9, 9a, 10a and 8a to the coaxial plate 1a and therefrom into the driven shaft 172.

With such a gearing or transmission, high and low transmissions of any desired size are realizable. Two examples thereof are:

1. If the following numbers of teeth are selected: Z10 = 21, Z8 = 22, Z9 = 20, Z10a = 22, Z8a = 21 and Z9a = 23, a total transmission of 1:230 is obtained.

2. If the same numbers of teeth as in the preceding first example are selected, except that the selected numbers of teeth for Z8a and Z9a are interchanged, a transmission of 4.88 is obtained.

These transmissions resulting from the formula:

$$\frac{1}{i_T} = \frac{1}{i_1} + \frac{i_1 - 1}{i_1 \cdot i_2}$$

where $i_T$ = total transmission $$i_1 = \frac{Z9}{Z9 - Z8} \text{ and}$$

$$i_2 = \frac{Z8a}{Z8a - Z9a},$$

can attain any desired low or high values when resonable numbers of teeth and reasonable dimensions of the gearing are applied.

Figure 32:
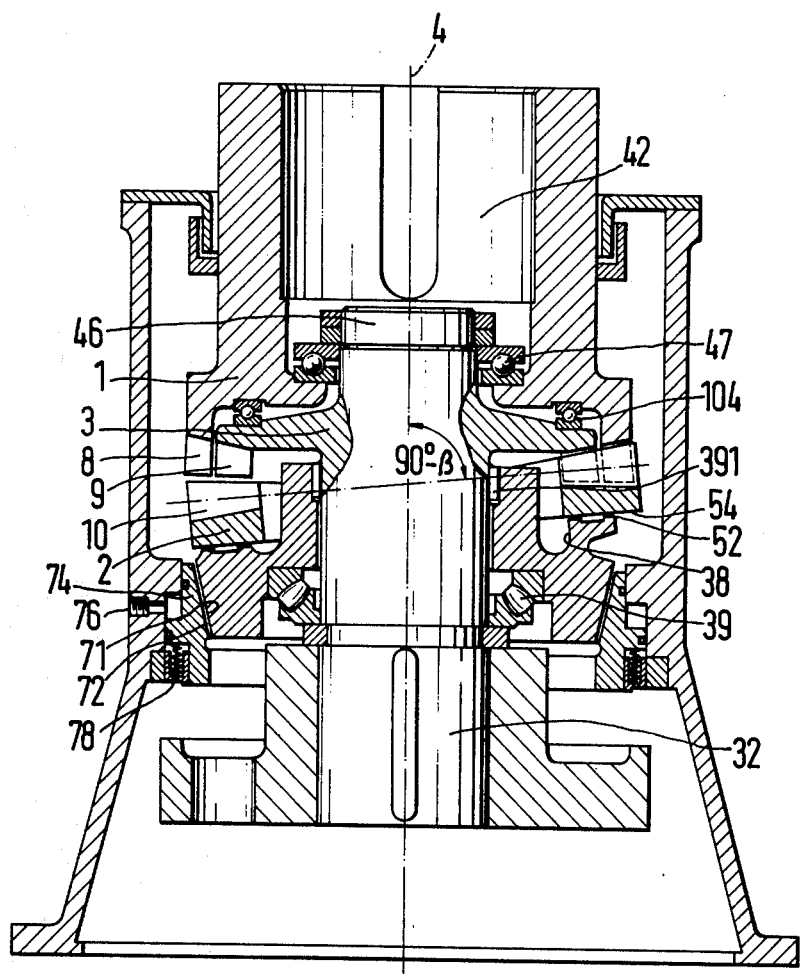
FIG. 32 is a longitudinal sectional view of clutch, change-over and variable speed gearing according to the invention.

FIG. 32 shows a cluth, change-over and variable-speed gearing or transmission. The inner plate 3 of both coaxial plates 1 and 3 are connected, fixed against relative rotation, to the drive shaft 32, and in the illustrated embodiment are in fact of one-piece or unipartite construction. The outer plate 1 of both coaxial plates 1 and 3 is connected to the driven shaft 42, fixed against relative rotation therewith.

The swash plate 2 is inclined at an angle of 90° − β with respect to the drive shaft 32. The undersurface 54 of the swash plate 2 is engaged by the inclined annular surface 52 of the bearing plate 38 which is mounted in bearings 39 and 391 and freely rotatable therein with respect to the drive shaft 32.

In the illustrated position of FIG. 32, the rotation of the drive shaft 32 is transmitted through the inner coaxial plate 3, the teeth 9 thereof, the teeth 10 of the swash plate 2 and the teeth 8 of the out coaxial plate 1 to driven shaft 42 without any transmission ratio or actually a transmission ratio of 1:1, so that in this illustrated position of FIG. 32, the system functions only as a coupling. None of the four rotary components (the coaxial plates 1 and 3, the swash plate 2 and the bearing plate 38) is held fast or locked.

The bearing plate 38 has an outer conical annular surface 71 which is located opposite the inner conical annular surface 72 of a brake ring 74. Through the introduction of oil at 76, the brake ring 74 is held against the force of a spring 78 in FIG. 32 in a position wherein both conical surfaces 71 and 72 do not engage one another. If oil is discharged at 76, the spring 78 then presses the brake ring 74 upwardly opposite the escaping oil and, depending upon the contact pressure between the surfaces 71 and 72, the bearing plate 38 will be braked to a greater or lesser extent. If the bearing plate 38 is completely braked, only a small amount of friction being sufficient to overcome the rolling friction between the swash plate 2 and the bearing plate 38, the illustrated device will function as gearing with a transmission ratio $i = Z3/Z1$. By braking the bearing plate 38 more or less completely, all desirable transmission ratios between this transmission ratio i and the transmission ratio equal to 1 i.e. where the gearing functions merely as a coupling, may be continuously or infinitely variably selected.

In accordance with the invention of the instant application, the construction shown in FIG. 32 permits a transition from an operational setting of the gearing as a coupling (with a transmission ratio of 1) continuously or infinitely variably through a multiplicity of optional intermediate settings (with partial braking of the bearing plate 38) to a maximal transmission ratio (with full braking or standstill of the bearing plate 38). The range of transmission of the gearing according to the invention is markedly improved over heretofore known variable speed transmissions; furthermore such heretofore known variable speed transmissions are considerably more complex than that of the invention and operate at a considerably lower efficiency.

There are claimed:

1. Planetary gearing comprising a rotatable swash plate, at least another toothed plate engaged by said swash plate, said plates being disposed in respective intersecting radial planes having an angle β included therebetween, said plates having on respective faces thereof different numbers of teeth formed on respective conical surfaces, the teeth of said other toothed plate having flanks, extension lines from all of said flanks intersecting in points located on an imaginary circle having an axis coincident with the axis of said other toothed plate, the teeth of said toothed swash plate having flanks, extension lines from all of said flanks of said swash plate teeth intersecting in a common point, said common point, during rotation of said swash plate, defining said imaginary circle as the base of an imaginary cone, an angle $\gamma = 2\pi$ being included between projected radial planes of the respective rows of the teeth of said swash plate and said other plate and being defined in the following equation:

$$\gamma = \arcsin\left[\frac{\cos\alpha}{Z1/Z2} \cdot (\pm\sqrt{\sin^2\alpha + (\frac{Z1}{Z2})^2 - 1} - \sin\alpha)\right]$$

where

Z1 = the number of teeth of the other plate,
Z2 = the number of teeth of the swash plate, and
2α = the angle formed between the flanks of a tooth.

2. Gearing according to claim 1 including an additional toothed plate coaxial with said other plate, the teeth of said other and said additional toothed plates jointly forming a virtual row of teeth mutually having substantially constant spacing therebetween, said coaxial toothed plates having respective numbers of teeth differing by a whole number from the number of teeth of said swash plate.

3. Gearing according to claim 2 wherein the ratio of the areas of the flanks of the teeth of said coaxial plates to one another is a reciprocal of the ratio of the respective radii of said coaxial plates to one another.

4. Gearing according to claim 1 including a drive shaft connected to said swash plate, and a driven shaft connected to said other toothed plate, and further including two additional toothed plates, said additional toothed plates and said other toothed plate being coaxial to said driven shaft, the teeth of said other and said two additional toothed plates having respective numbers of teeth differing by a whole number from the number of teeth of said swash plate.

5. Gearing according to claim 1 wherein the flanks of the teeth of one of said toothed plates have a convex shape and form part of the surface of an imaginary cylinder, said cylinder having an axis parallel to the radial plane of a tooth of one of said plates and disposed in the intersection of two planes which extend through a flank of the respective tooth within the internal angle between adjacent teeth of one of said plates.

6. Gearing according to claim 1 including an additional toothed plate coaxial with said other plate and wherein the flanks of the teeth of said swash plate have a convex shape and form part of the surface of an imaginary cylinder, said cylinder having an axis parallel to the radial plane of a tooth of said swash plate and disposed in the intersection of two planes which extend through a flank of one of the teeth of said plates within the internal angle between adjacent teeth of one of said plates.

7. Gearing according to claim 1 including an additional toothed plate coaxial with said other plate and wherein the teeth of said swash plate are pivotable about respective pivot axes extending radially to the axis of said swash plate.

8. Gearing according to claim 7 wherein the pivot axis of each of said pivotable teeth of said swash plate is disposed at a level that is half the height of the respective flanks of said pivotable teeth.

9. Gearing according to claim 7 wherein each of said pivotable teeth of said swash plate carries a respective pin outside the flanks of the respective tooth, said pin being disposed eccentrically to the pivot axis of the respective tooth, and including a guide ring floating disposed coaxially to said swash plate and formed with a respective bore in which said pin is loosely received.

10. Gearing according to claim 7 wherein the teeth of said coaxial additional and other toothed plates jointly form a virtual row of teeth mutually having substantially constant spacing therebetween, said radial plane of said swash plate being pivoted about the point of intersection of the axis of said swash plate with said radial plane of said swash plate so that angle $\beta$ is decreased by a correction factor $\Delta\beta$ determinable by equation:

$$\sin \Delta\beta = (2\pi/n) \cdot \sin \gamma$$

wherein $n$ = the number of teeth in the virtual row of teeth.

11. Gearing according to claim 10, wherein the teeth of said coaxial toothed plates are pivotable about an axis extending substantially perpendicularly to respective planes bisecting said teeth of said coaxial toothed plates in the height thereof, and are shiftable in direction of said last-mentioned axis.

12. Gearing according to claim 10 including guide means extending perpendicularly to a plane bisecting the teeth of said swash plate in the height thereof, the teeth of said swash plate being shiftable along said guide means.

13. Gearing according to claim 12 including biasing means for pressing each of said teeth of said swash plate into said virtual row of teeth.

14. Gearing according to claim 13 wherein said biasing means is a spring.

15. Gearing according to claim 13 wherein said biasing means is a hydraulic device.

16. Gearing according to claim 10 including a bearing for each of the pivots of said teeth of said swash plate, a guide plate disposed parallel to said axis of said coaxial plates, a pin carrying said bearing and being guidable in said guide plate so as to be shiftable parallel to said axis of said coaxial plates, and drive gear means for imparting a reciprocating movement to said pin.

17. Gearing according to claim 16 wherein each of said pins is spring-biased towards said virtual row of teeth.

18. Gearing according to claim 16 wherein said drive gear means comprises a cam plate having an annular surface for sliding the teeth of said swash plate into said virtual row of teeth so deeply that they fully mesh within the spaces between the teeth of said virtual row of teeth.

19. Gearing according to claim 18 wherein said cam plate is so constructed that a plurality of groups of said teeth of said swash plate are each meshable thereby with a respective virtual row of teeth.

20. Gearing according to claim 10 wherein said teeth of said swash plate are shiftable freely about the periphery of said swash plate.

21. Gearing according to claim 19 including pivotal bearing bed means, said teeth of said swash plate being mounted in said pivotal bearing bed means and being radially displaceable therein.

22. Gearing according to claim 21 including biasing means for pressing said teeth of said swash plate radially inwardly.

23. Gearing according to claim 20 including cam plate means for pressing said teeth of said swash plate radially inwardly, said cam plate means determining the depth of penetration by said last-mentioned teeth into said virtual row of teeth.

24. Gearing according to claim 13 wherein said biasing means has a characteristic that said biasing means exerts equal pressure on all of the flanks of the teeth of said swash plate.

25. Gearing according to claim 13 wherein said biasing means comprise a flexible pad.

26. Gearing according to claim 13 wherein said biasing means comprise a helical spring.

27. Gearing according to claim 13 wherein said biasing means comprise a pocket of plate springs.

28. Gearing according to claim 13 wherein said teeth of said swash plate are formed of resilient material.

29. Gearing according to claim 13 wherein said teeth of resilient material are formed of zigzag metal sheets.

30. Gearing according to claim 1 including an additional toothed plate coaxial with said other toothed plate and disposed radially inwardly thereof, said radially inward additional toothed plate having a first row of teeth on one side of a reflection plane thereof and a second row of teeth on the other side of said reflection plane and being a mirror image of said first row of teeth, a radially outward further toothed plate being a mirror image of the radially outward other toothed plate, said further toothed plate having teeth which are a mirror image of the teeth of said other toothed plate, the teeth of said swash plate meshing with said first row of teeth of said additional toothed plate and said teeth of said other toothed plate, another swash plate meshing with said second row of teeth of said additional toothed plate and said teeth of said further toothed plate, and means for driving both of said swash plates, the numbers of teeth of said first-mentioned swash plate, said other toothed plate and said first row of teeth of said additional toothed plate being independent of the numbers of teeth of said other swash plate, said further toothed plate and said second row of teeth of said additional toothed plate, the total transmission $i_T$ of the gearing being determinable by the following equation:

$$\frac{1}{i_T} = \frac{1}{i_1} + \frac{i_1 - 1}{i_1 \cdot i_2}$$

wherein $$i_1 = \frac{Z9}{Z9 - Z8} \text{ and } i_2 = \frac{Z8a}{Z8a - Z9a}$$

and $Z8$ = the number of teeth of the other toothed plate,
$Z9$ = the number of teeth of the first row of teeth of the additional toothed plate,
$Z8a$ = the number of teeth of the further toothed plate, and
$Z9a$ = the number of teeth of the second row of teeth of the additional toothed plate.

31. Gearing according to claim 1 including an additional toothed plate coaxial with said other plate, a drive shaft secured against relative rotation therewith to one of said coaxial plates, a driven shaft secured against relative rotation therewith to the other of said coaxial plates, and a rotatably mounted bearing plate for said swash plate, and means for applying a control movement to said bearing plate whereby it serves as a reaction member.

32. Gearing according to claim 1 wherein said swash plate is formed with a limited number of individual teeth spaced at uniform intervals from one another.

33. Gearing according to claim 1 wherein said teeth are all substantially triangular.

* * * * *

UNITED STATES PATENT AND TRADEMARK OFFICE
CERTIFICATE OF CORRECTION

PATENT NO. : 4,041,808
DATED : August 16, 1977
INVENTOR(S) : KURT GERHARD FICKELSCHER It is certified that error appears in the above-identified patent and that said Letters Patent are hereby corrected as shown below:

In the Drawings:

FIG. 4, read reference character "10" as --10'--

Signed and Sealed this

Twenty-fourth Day of January 1978

[SEAL]

Attest:

RUTH C. MASON
Attesting Officer

LUTRELLE F. PARKER
Acting Commissioner of Patents and Trademarks